US009643625B2

(12) United States Patent
Creighton et al.

(10) Patent No.: US 9,643,625 B2
(45) Date of Patent: May 9, 2017

(54) SYSTEM AND METHOD FOR POWERED RAILCAR DOORS

(71) Applicant: Trinity Industries, Inc., Dallas, TX (US)

(72) Inventors: George S. Creighton, Pompano Beach, FL (US); Aubra D. McKisic, Flower Mound, TX (US)

(73) Assignee: Trinity Industries, Inc., Dallas, TX (US)

( * ) Notice: Subject to any disclaimer, the term of this patent is extended or adjusted under 35 U.S.C. 154(b) by 257 days.

(21) Appl. No.: 14/257,506

(22) Filed: Apr. 21, 2014

(65) Prior Publication Data
US 2014/0360401 A1 Dec. 11, 2014

Related U.S. Application Data

(63) Continuation of application No. 12/948,583, filed on Nov. 17, 2010, now Pat. No. 8,701,565.

(51) Int. Cl.
*B61D 39/00* (2006.01)
*B61D 7/00* (2006.01)
*E05F 15/53* (2015.01)

(52) U.S. Cl.
CPC ............ *B61D 39/006* (2013.01); *B61D 7/00* (2013.01); *B61D 39/001* (2013.01); *E05F 15/53* (2015.01); *E05Y 2900/51* (2013.01); *Y02T 30/30* (2013.01)

(58) Field of Classification Search
CPC ... B61D 7/18; B61D 7/24; B61D 7/28; B61D 39/00; B61D 39/006; B61D 5/08; B61D 19/004; E05F 15/53; E05F 15/611
(Continued)

(56) References Cited

U.S. PATENT DOCUMENTS 686,902 A 11/1901 Müller et al.
1,934,929 A 11/1933 Jonsson
(Continued)

FOREIGN PATENT DOCUMENTS

DE 3920776 6/1987
EP 0225855 6/1987
(Continued)

OTHER PUBLICATIONS

Notification about Violation of the Requirement for Unity of Invention issued by the Federal Institute of Industrial Property (FIIP) for Application No. 2013127177/11 (040501) (English translation included)—Jan. 26, 2016.
(Continued)

*Primary Examiner* — Mark Le
(74) *Attorney, Agent, or Firm* — Baker Botts, LLP

(57) ABSTRACT

In one embodiment, a system includes a first door assembly operable to at least partially cover an opening of a rail car. The system also includes an actuator. A first common linkage is coupled to the actuator and is operable to reciprocally move in a longitudinal direction relative to the actuator. In particular embodiments, a first secondary linkage is coupled to the first common linkage and is coupled to an exterior surface of the first door assembly, wherein the first secondary linkage cooperates with the first common linkage to move the first door assembly between an open position and a closed position over the top hatch of the rail car.

10 Claims, 32 Drawing Sheets

(58) Field of Classification Search
USPC ......... 105/377.05, 377.06, 377.07, 250, 251, 105/252, 299
See application file for complete search history.

(56) References Cited

U.S. PATENT DOCUMENTS

| | | | |
|---|---|---|---|
| 2,629,339 A | | 2/1953 | Kovachick |
| 2,899,912 A | | 8/1959 | Janeczko |
| 3,169,492 A | | 2/1965 | Stiefel et al. |
| 3,476,042 A | * | 11/1969 | Carney ............... B61D 39/00 105/377.06 |
| 3,786,764 A | | 1/1974 | Beers, Jr. et al. |
| 3,828,948 A | | 8/1974 | Peterson |
| 3,913,969 A | | 10/1975 | Hoch |
| 4,077,329 A | | 3/1978 | Adler |
| 4,210,358 A | | 7/1980 | Sweet et al. |
| 4,542,701 A | | 9/1985 | Fischer et al. |
| 4,542,931 A | | 9/1985 | Walker, Jr. |
| 4,606,570 A | * | 8/1986 | Neumann ............. B60P 3/426 105/243 |
| 4,617,868 A | * | 10/1986 | Wahlstrom ........... B61D 5/004 105/247 |
| 4,627,658 A | | 12/1986 | Vold et al. |
| 4,682,811 A | | 7/1987 | Ooguro |
| 4,767,152 A | | 8/1988 | Stluka et al. |
| 4,843,974 A | | 7/1989 | Ritter et al. |
| 5,359,942 A | | 11/1994 | Ward |
| 5,488,911 A | | 2/1996 | Riggin |
| 5,542,734 A | | 8/1996 | Burchett et al. |
| 5,657,700 A | * | 8/1997 | Bounds ............... B61D 7/30 104/2 |
| 5,988,732 A | | 11/1999 | Schouten |
| 6,220,178 B1 | | 4/2001 | Jost |
| 6,402,223 B2 | | 6/2002 | Ser et al. |
| 6,402,224 B1 | | 6/2002 | Monaco et al. |
| 6,955,126 B2 | | 10/2005 | Taylor |
| 7,037,034 B2 | | 5/2006 | Dillingham |
| 7,051,661 B2 | | 5/2006 | Herzog et al. |
| 7,063,022 B1 | | 6/2006 | Marchiori et al. |
| 7,093,544 B1 | | 8/2006 | Allen et al. |
| 7,331,295 B1 | | 2/2008 | Marchiori |
| 7,389,732 B2 | | 6/2008 | Taylor |
| 2007/0084378 A1 | | 4/2007 | Creighton et al. |
| 2007/0175357 A1 | | 8/2007 | Dorian et al. |

FOREIGN PATENT DOCUMENTS

| | | | |
|---|---|---|---|
| FR | | 2610584 | 8/1988 |
| WO | WO 2009/099980 | * | 8/2009 |

OTHER PUBLICATIONS

Chinese Office Action issued in Application No. 201180064490.6; 30 pages with English Translation, Apr. 30, 2015.
Australian Office Action issued in Application No. 2011329156; 4 pages, Jan. 30, 2015.
Invitation to Pay Fees; PCT/US2011/060722, p. 6, Feb. 24, 2012.
International Search Report and Written Opinion; PCT/US2011/060722; p. 18, Jul. 2, 2012.
International Preliminary Report on Patentability and Written Opinion; PCT/US2011/060722; p. 11, May 21, 2013.
Mexican Office Action issued in Application No. MX/a/2013/005574; 3 pages, May 22, 2015.

* cited by examiner

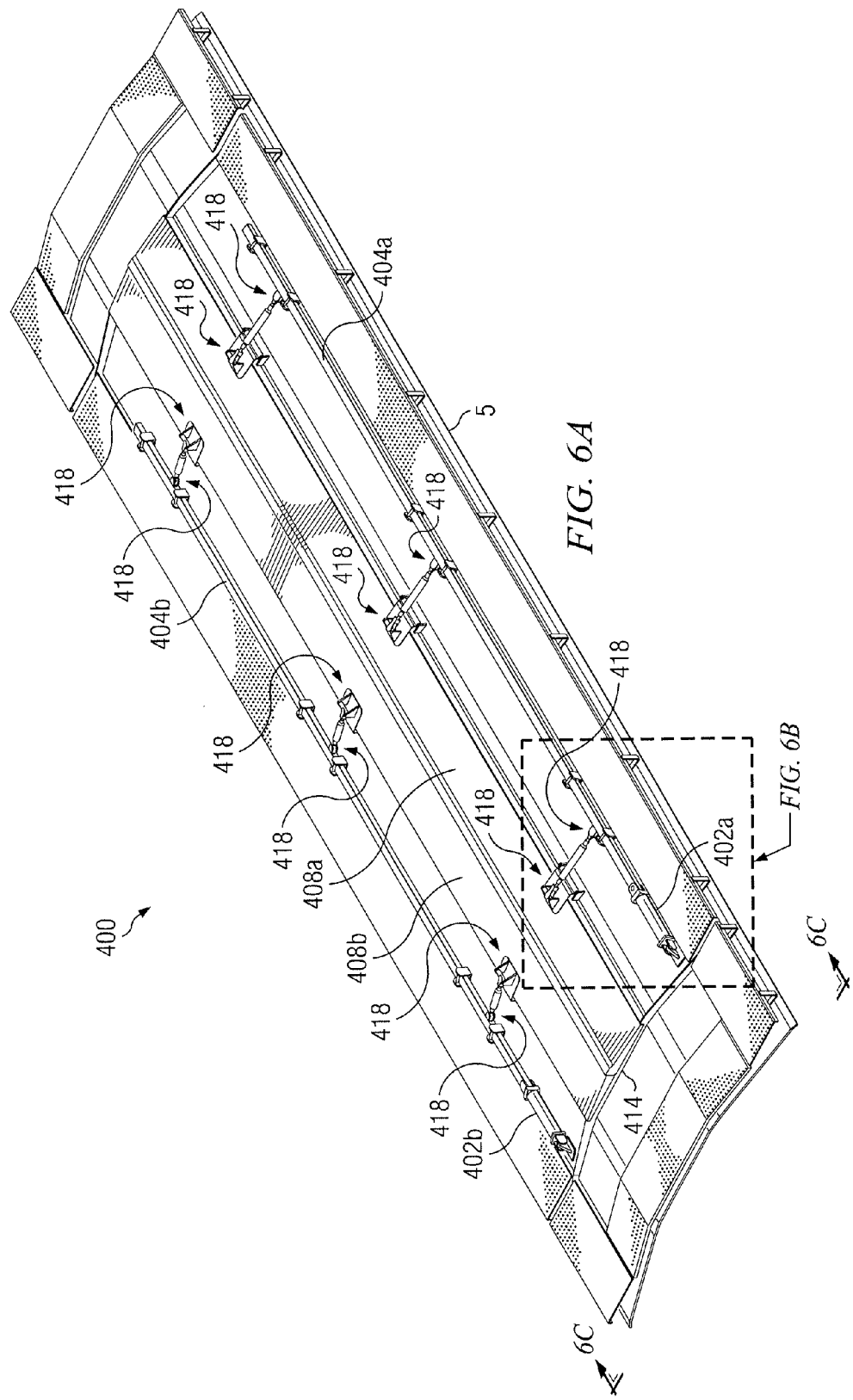

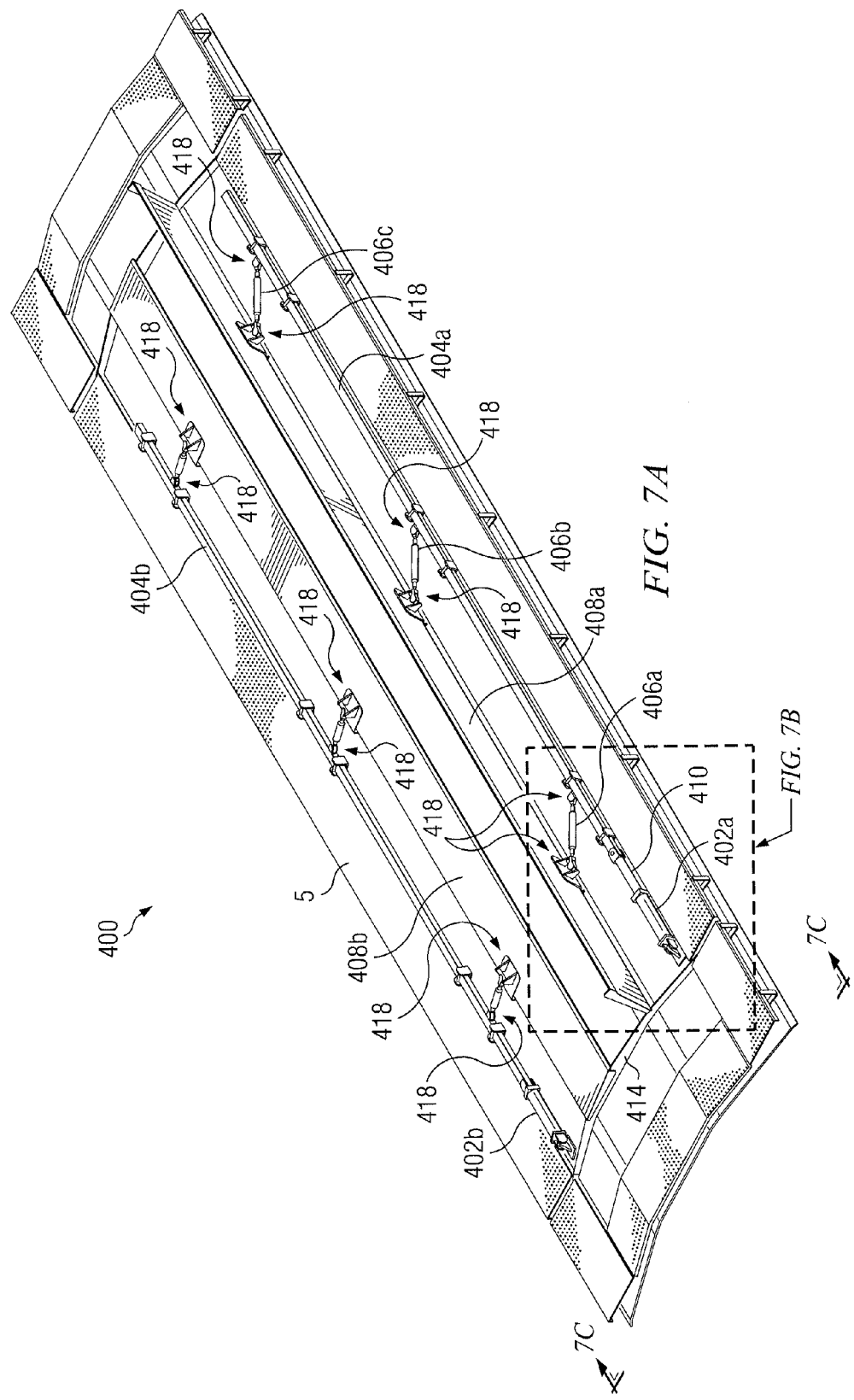

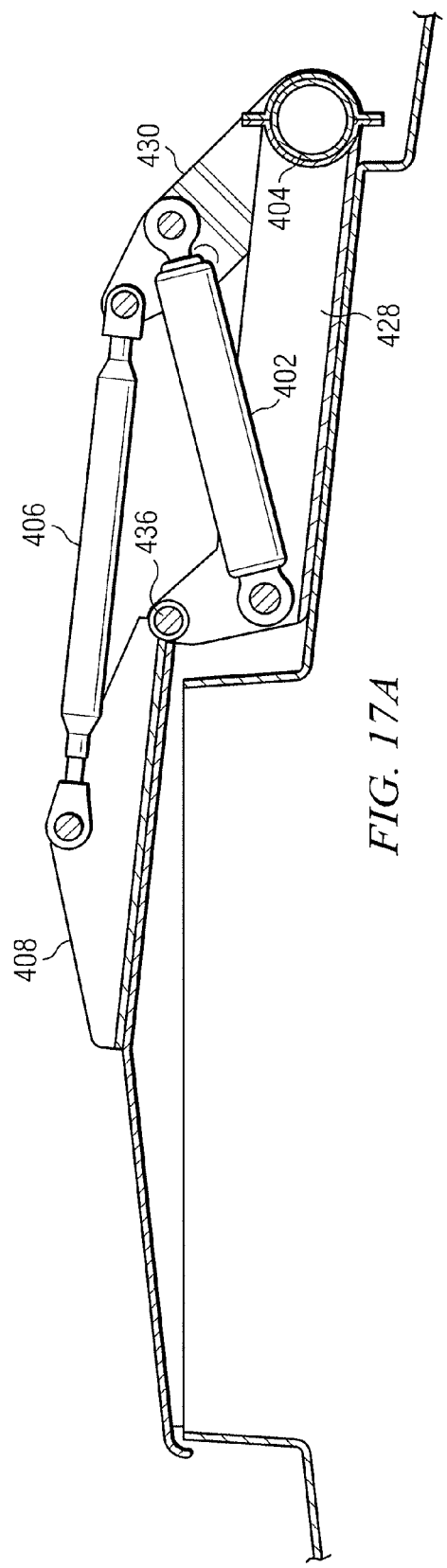

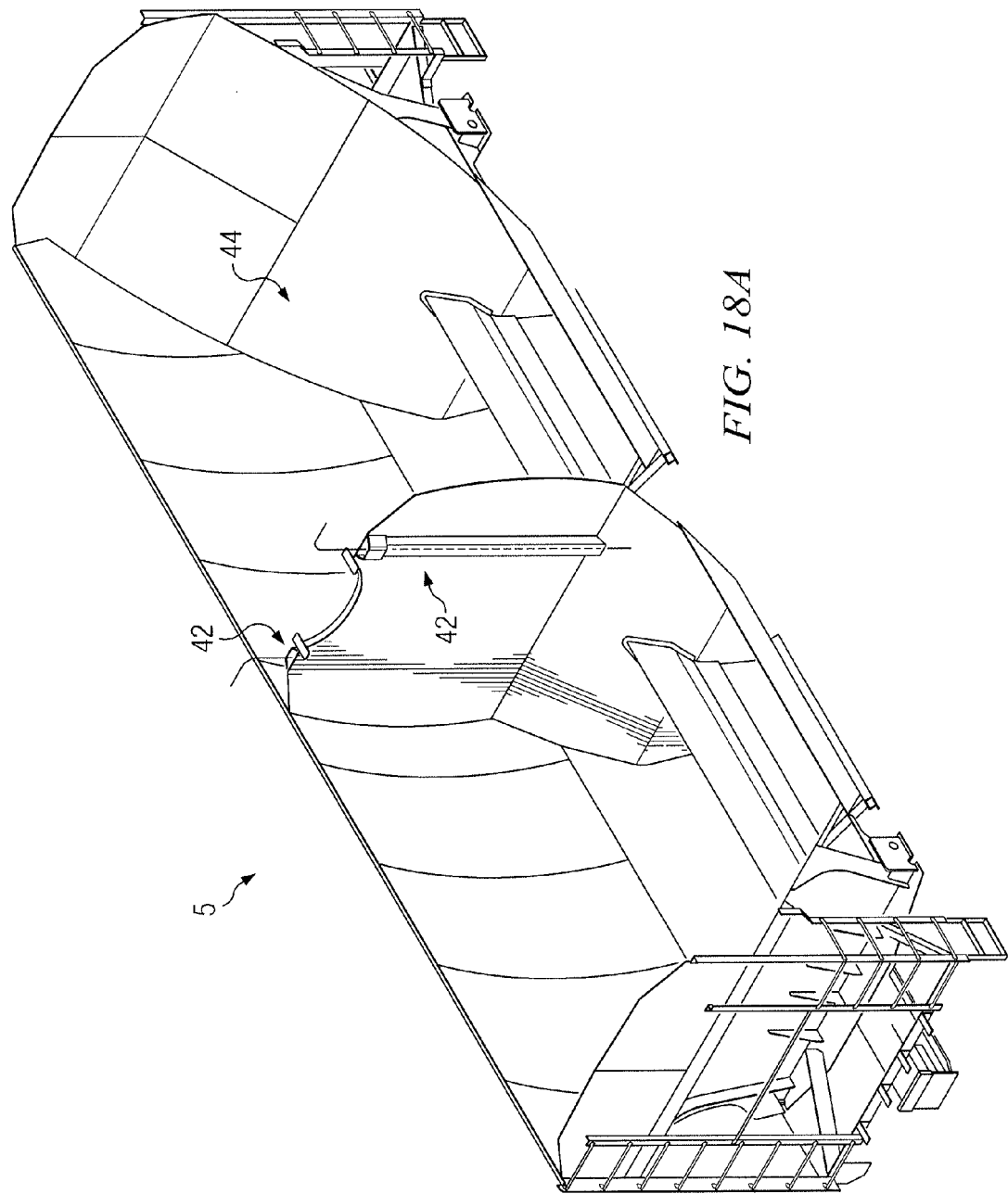

SYSTEM AND METHOD FOR POWERED RAILCAR DOORS

TECHNICAL FIELD OF THE INVENTION

The present disclosure relates generally to powered systems on railroad cars, and more particularly to a system and method for powered railcar doors.

BACKGROUND OF THE INVENTION

Railway cars or railroad cars with one or more hoppers have been used for many years to transport and sometimes store dry, bulk commodities and materials. Hopper cars are frequently used to transport coal, sand, metal ores, ballast, aggregates, grain and any other type of lading which may be satisfactorily discharged through respective openings formed in one or more hoppers. Respective discharge openings are often provided at or near the bottom of each hopper to rapidly discharge cargo. A variety of door assemblies and gate assemblies along with various operating mechanisms have been used to open and close discharge openings associated with railway cars.

Hopper cars may be classified as open or closed. Hopper cars may have relatively short sidewalls and end walls or relatively tall or high sidewalls and end walls. The sidewalls and end walls of many hopper cars are typically reinforced with a plurality of vertical side stakes. The sidewalls and end walls are typically formed from steel or aluminum sheets. Some hopper cars include interior frame structures or braces to provide additional support for the sidewalls. Some hopper cars may be generally described as top loading and bottom unloading. Such hopper cars typically require closing gates or doors located underneath the hopper car prior to loading and opening the gates or doors only when the hopper car is at a specific location in an unloading facility. Through use of linkages and one or more power sources such as an air cylinder, a hydraulic cylinder, an electrical motor, capstan drive system or other types of operating mechanisms associated with hopper cars, the gates or doors may be closed prior to loading and opened to discharge lading.

Railroad cars or railway cars often use pneumatic systems to operate various components and/or to carry out various functions associated with each railroad car or railway car. In particular, the brakes of a railroad car may be actuated when an air pressure signal from an associated locomotive is received by the respective brake system. A dedicated train line extending from an associated locomotive may supply air for charging the respective brake system of each railroad car attached to the associated locomotive and may allow transmission of an air pressure signal that directs the brake cylinder of each railroad car to actuate.

SUMMARY OF THE INVENTION

In accordance with teachings of the present disclosure, air may be accumulated in one or more auxiliary reservoirs or air reservoirs associated with a railroad car while charging a respective air brake system associated with the railroad car. Air pressure in the respective air brake system may be allowed to reach a predetermined value prior to supplying air to one or more associated air reservoirs or auxiliary reservoirs. Once the predetermined value of air pressure in the respective brake system is reached, a portion of the air flowing through an associated air brake line (sometimes referred to as "excess air") may be bled from the respective air brake system. Such air from the respective air brake system may be accumulated in one or more auxiliary reservoirs without compromising performance of the respective air brake safety system. Each auxiliary reservoir may be adapted to supply air to an auxiliary cylinder or other types of pneumatic equipment or components on the associated railroad car.

A particular embodiment of the present disclosure may include bleeding air from an emergency brake reservoir. Another embodiment of the present disclosure may include bleeding air from an air brake system through a port in a control valve that is one component of the air brake system.

In one embodiment, a system includes a first door assembly operable to at least partially cover an opening of a rail car. The system also includes an actuator. A first common linkage is coupled to the actuator and is operable to reciprocally move in a longitudinal direction relative to the actuator. In particular embodiments, a first secondary linkage is coupled to the first common linkage and is coupled to an exterior surface of the first door assembly, wherein the first secondary linkage cooperates with the first common linkage to move the first door assembly between an open position and a closed position over the top hatch of the rail car.

In another embodiment, a method includes at least partially covering an opening of a rail car with a first door assembly. The method also includes reciprocally moving a first common linkage coupled to an actuator in a longitudinal direction relative to the actuator. The method also includes coupling a first secondary linkage to the first common linkage and to an exterior surface of the first door assembly, wherein the first secondary linkage cooperates with the first common linkage to move the first door assembly between an open position and a closed position over the top hatch of the rail car.

In yet another embodiment, a system includes a first door assembly operable to at least partially cover an opening of a rail car. The system also includes an actuator. Additionally, the system includes a first common linkage coupled to the actuator and operable to reciprocally move in a longitudinal direction relative to the actuator and a first secondary linkage coupled to the first common linkage and coupled to an exterior surface of the first door assembly, and wherein the actuator is operable to cooperate with the first common linkage and the second common linkage to move the first door assembly between a closed position and an open position over the top hatch of the rail car by rotating the first common linkage about a longitudinal axis of the first common linkage.

In yet another embodiment, a method includes at least partially covering an opening of a rail car with a first door assembly. The method also includes reciprocally moving a first common linkage coupled to an actuator in a longitudinal direction relative to the actuator. The method further includes coupling a first secondary linkage to the first common linkage and to an exterior surface of the first door assembly.

In yet another embodiment, a system includes a door assembly operable to at least partially cover an opening of a rail car and a hydraulic motor operable to move the door assembly between a first open position and a second closed position, wherein the hydraulic motor is powered by air pressure.

Technical advantages of particular embodiments may include operating a discharge door control system using one or more pneumatic components without requiring a separate dedicated train line or a wayside air supply to provide operating air to the pneumatic components or components.

Operating discharge door control systems independently of a separate, dedicated train line in accordance with teachings of the present disclosure may allow an associated railroad car to be placed in a train with any mix of railroad cars and still provide satisfactory control of associated discharge doors.

Further technical advantages of particular embodiments may include accumulating air in an auxiliary reservoir once a predetermined pressure exists in an associated brake system. This may prevent delays in moving a train that might otherwise be associated with time required to charge one or more auxiliary reservoirs prior to reaching an initial full operating pressure or satisfactory operating pressure required for the associated brake system.

Still further technical advantages of particular embodiments may include charging an auxiliary system or pneumatic system using an existing port on a control valve that controls air flow to and from a brake system of an associated railroad car.

Pneumatic systems requiring a dedicated train line may be expensive. Such pneumatic systems may also require that all cars in the train have the same dedicated train line equipment to transmit air from the locomotive to each car along the train. Thus, a railroad car with pneumatic systems or components that require a dedicated train line to operate one or more pneumatic systems or pneumatic components may generally only be used in trains where all of the cars are equipped to accommodate the dedicated train line. In lieu of a separate dedicated train line, prior methods to supplying air to respective pneumatic systems may include respective wayside air supplies for each railroad car when the train is located as an appropriate track side facility. Teachings of the present disclosure allow railroad cars with respective pneumatic systems and/or pneumatic components to be included in a train which does not include a dedicated train line to supply air to such pneumatic systems and/or components and does not require wayside air supplies to satisfactory operate such pneumatic systems and/or components.

For some embodiments railroad cars associated with moving iron ore from taconite mines or moving ore from other mining facilities may include one or more auxiliary reservoirs operable to supply air to operate pneumatic components associated with such railroad cars. Private railroads (sometimes referred to as "short lines") may be used to move ore from a mine to an associated ore processing facility. Such facilities often do not have wayside air supplies.

Other technical advantages of particular embodiments of the present disclosure include the ability to automatically open and close rail car hatches, discharge openings, and other doors by operating a switch. Using automated hydraulic or pneumatic systems may eliminate the need to manually open or close rail car doors. Thus, automated systems may reduce the amount of manpower required to load and unload lading from rail cars.

In some embodiments, powering rail car hatches and discharges openings with hydraulic and/or pneumatic systems enable automated systems to be used in environments in which electricity is a hazard. In some situations, electrical systems increase the risk of fire, explosion, or other hazards. Thus, train operators may use hydraulic and/or pneumatic automated systems without risking dangerous conditions.

Other technical advantages will be readily apparent to one of ordinary skill in the art from the following figures, descriptions, and claims. Moreover, while some specific advantages have been enumerated above, various embodiments may include all, some, or none of the enumerated advantages.

BRIEF DESCRIPTION OF THE DRAWINGS

A more complete understanding of embodiments of the disclosure will be apparent from the detailed description taken in conjunction with the accompanying drawings in which:

FIGS. 6A-6C illustrate various perspective views of a particular embodiment of a powered remotely controlled hatch system in accordance with the present disclosure in which door assemblies are in a closed position;

FIGS. 7A-7C illustrate various perspective views of a particular embodiment of a powered remotely controlled hatch system in accordance with the present disclosure in which one door assembly is in a closed position and one door assembly is in an open position;

FIGS. 17A and 17B illustrate a cross-sectional views of the powered remotely controlled hatch system of FIG. 15 in accordance with particular embodiments of the present disclosure; and FIGS. 18A-18D illustrate an interior portion of a rail car and a vent in accordance with particular embodiments of the present disclosure.

DETAILED DESCRIPTION OF THE INVENTION

Various embodiments and their advantages may be understood by referring to FIGS. 1 through 14 of the drawings.

Pneumatic systems and/or auxiliary systems incorporating teachings of the present disclosure may be satisfactorily used with a wide variety of railroad cars or railway cars including, but not limited to, hopper cars, covered or closed hopper cars, open hopper cars, coal cars, ore cars and ballast cars. Various features of the present disclosure may be satisfactorily used with closed or covered hopper cars and open hopper cars that carry aggregate, ore, iron ore, grain, plastic pellets and other types of bulk lading. Various teachings of the present disclosure may be satisfactorily used with ballast cars (not expressly shown). Examples of lading carried by covered or closed hopper cars may include, but are not limited to, corn distillers dried grains (DDG), corn condensed distillers solubles (CDS), corn distillers dried grains/solubles (DDGS) and wet distillers grain with solubles (WDGS). Such products may be associated with ethanol production from corn and/or other types of grain.

Teachings of the present disclosure may be satisfactorily used with railroad cars or railway cars having a wide variety of systems, discharge openings, door assemblies or gates. The present disclosure may be used with railway cars having longitudinal discharge openings, longitudinal door assemblies, lateral discharge openings, and/or lateral door assemblies. Air cylinders and various types of air motor drive systems may be used to operate associated systems.

Figure 1:
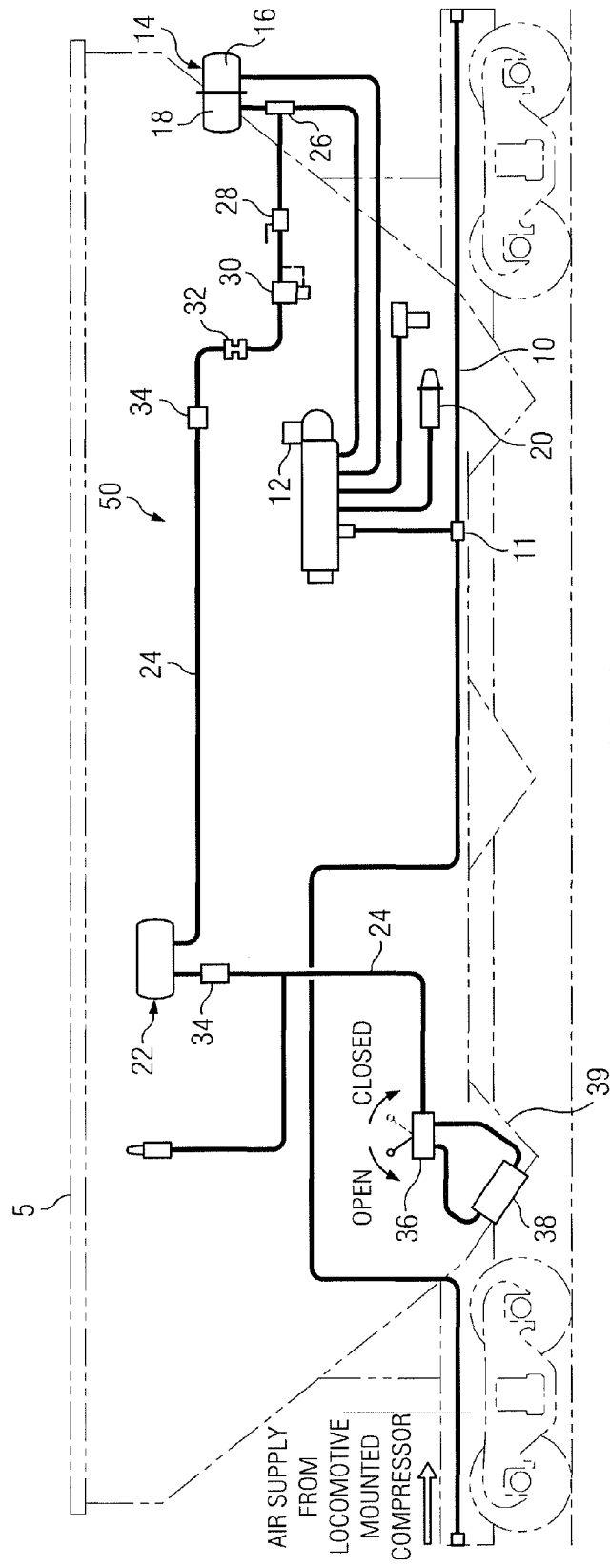
FIG. 1 illustrates a schematic diagram of a pneumatic system which may be used to operate brakes and discharge doors of an associated railroad car in accordance with an embodiment of the present disclosure.
Figure 2:
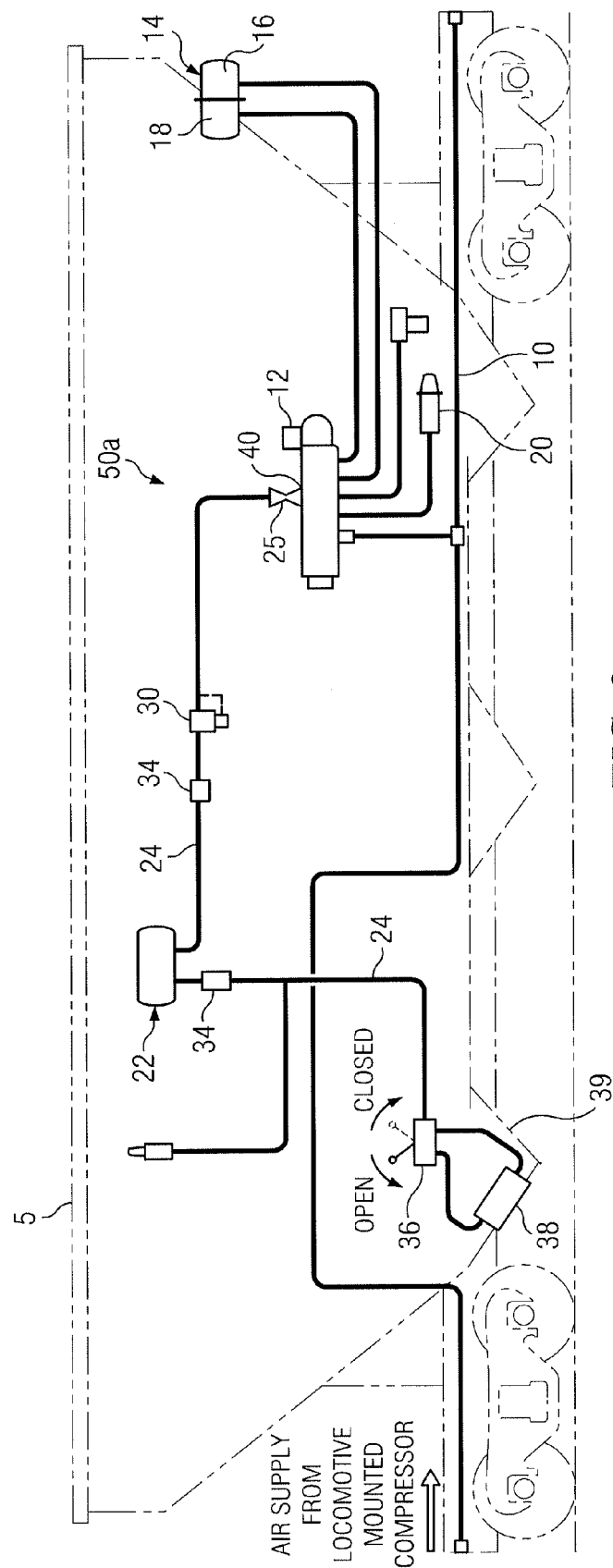
FIG. 2 illustrates a schematic diagram of a pneumatic system which may be used to operate brakes and discharge doors of an associated railroad car by supplying air to operate the discharge doors from a port disposed in a control valve associated with the brake system in accordance with an embodiment of the present disclosure.

Railroad car 5 as shown in FIGS. 1 and 2 may be generally described as an open hopper car with bottom discharge openings or outlets. Respective door assemblies or gates may be opened and closed to control discharge of lading from discharge openings or outlets associated with railroad car 5. However, the present disclosure is not limited to open hopper cars with bottom discharge openings. The present disclosure is not limited to any type of railroad car, any type of pneumatic system or component and/or any type of lading.

FIG. 1 is a schematic representation of a pneumatic system of associative with railroad car 5. The pneumatic system may be used to operate air brakes (not expressly shown) and discharge doors 39 in accordance with one embodiment of the present disclosure. The illustrated embodiment incorporates a conventional railroad car air brake system 50 with auxiliary air reservoir 22 that may be used to supply air to operate one or more air powered systems or pneumatic systems associated with railroad cars. For example, auxiliary air reservoir 22 may supply air to operate discharge doors 39 of railroad car 5.

Air used to operate the brakes on railroad cars may be transmitted through brake pipe 10 to control valve 12 and may accumulate in brake reservoir 14. Brake line 10 may be coupled with corresponding brake lines in attached railroad cars (not expressly shown) to form a train line or brake air train line operable to communicate air from an associated locomotive (not expressly shown) to each railroad car attached to the locomotive as part of a train.

Brake reservoir 14 may include service reservoir 16 and emergency reservoir 18. A compressor (not expressly shown) located on an associated locomotive (not expressly shown) may cause air to be transmitted through the associated train line including brake pipe 10. Air from brake pipe 10 may enter air brake system 50 of railroad cars through branch pipe tee 11 and ultimately accumulate in brake reservoir 14.

Brake pipe 10 may be a part of the brake train line that extends the length of an associated train and runs through all railroad cars of the train. Brake pipe 10 may serve at least two purposes. First, air travels through brake pipe 10 to accumulate in brake reservoir 14 for each individual railroad car. Second, brake pipe 10 facilitates transmission of a pressure drop that activates respective brakes associated with each railroad car.

When a locomotive engineer "applies the brakes," a pressure drop or sudden reduction in air pressure typically occurs in brake line 10. This reduction or drop in air pressure is transmitted through each brake pipe 10 along the entire length of the train. The drop in air pressure provides a signal for respective control valve 12 on each railroad car to release high pressure air from service brake reservoir 16 to brake cylinder 20 which activates the associated brakes of each railroad car. Brake cylinder 20 may be mounted on a car body or may be mounted on railway trucks of the associated railroad car.

Emergency brakes of a railroad car generally operate similarly to the service brakes. When an engineer determines that emergency brakes are necessary, a pressure reduction signal is sent through brake pipe 10 to control valve 12. Because of the severe pressure drop when applying emergency brakes, each control valve 12 senses that air from emergency reservoir 18 is needed to transmit to associated brake cylinder 20 to apply emergency braking force to stop the respective railroad car.

In accordance with a particular embodiment, air from emergency reservoir 18 may be allowed to accumulate in auxiliary reservoir 22. Air from auxiliary reservoir 22 may be used to operate other air powered systems or pneumatic components of an associated railroad car. Air may accumulate in auxiliary reservoir 22 while sufficient air pressure in emergency reservoir 18 is maintained such that the emergency brakes will be operational if needed.

Air may pass from emergency reservoir 18 through air pipe 24 to reach auxiliary reservoir 22. Air pipe 24 may be a ⅜ths inch diameter pipe. The air may travel from emergency reservoir 18 through branch pipe tee 26 and then through cutout cock 28. Air may then move through pressure protection valve 30.

Along air pipe 24, restrictor orifice 32 may be positioned to ensure that no more than a certain flow rate of air is allowed to leave emergency reservoir 18. Restrictor orifice 32 may be 1/32nd of an inch in diameter. The Manual of Standards and Recommended Practices published by The Association of American Railroads (AAR) may govern the size of restrictor orifice 32. The Manual may include regulations that govern removing air from emergency reservoir 18 to use to supply air-operated devices. In addition to restrictor orifice 32, check valve 34 may be a rubber seated check valve that is operable to prevent airflow from returning back to emergency reservoir 18 from the auxiliary device and the auxiliary reservoir 22. Check valve 34 may be configured in accordance with standards of recommended practices discussed above with respect to restrictor orifice 32.

Some embodiments of the present disclosure may incorporate pressure protection valve 30. Pressure protection valve 30 may be a device that senses a pressure differential between atmospheric pressure and a source pressure. The source pressure acting on pressure protection valve 30 in the embodiment illustrated in FIG. 1, may be pressure from emergency reservoir 18. Once the differential pressure reaches a predetermined value, pressure protection valve 30 will open and allow air to pass through. If the pressure differential between emergency reservoir 18 and the atmosphere drops below the predetermined value, no air will be allowed to pass through pressure protection valve 30.

Thus, pressure protection valve 30 may be set at a value that only allows air to pass through pressure protection valve 30 to auxiliary reservoir 22 if there is sufficient air in emergency reservoir 18 to accommodate emergency operations of the associated brake system. In this manner, pressure protection valve 30 may allow relatively slow accumulation of air from associated emergency reservoir 18 into auxiliary reservoir 22. Thus, air may be transmitted through pressure protection valve 30 when normal operation of an associated locomotive's compressor or other factors cause air pressure in emergency reservoir 18 to exceed a predetermined value. The predetermined value may be selected such that emergency reservoir 18 remains satisfactorily charged with air to operate the emergency brakes and still allow a small quantity of air to gradually bleed or flow from emergency reservoir 18 to accumulate in auxiliary reservoir 22. In certain embodiments, it may take forty-five (45) minutes to fully charge auxiliary reservoir 22 once pressure protection valve 30 opens for the first time.

Pressure protection valve 30 may allow a railroad car's air brake system to be fully charged before any air is allowed to pass to auxiliary reservoir 22. Without pressure protection valve 30, auxiliary reservoir 22 would likely have to be fully charged before an engineer could certify that brake reservoir 14 and emergency reservoir 18 had proper air pressure to allow moving an associated train. Having to fully charge auxiliary reservoir 22 may cause an increase in the time required to charge railroad car's brake system to an initial operating pressure that must be reached at initial terminal test points. This initial operating pressure ensures that the railroad car's brakes will operate should they be needed before the compressor located on the locomotive has fully charged the air brake system during normal operation. The emergency reservoir 18 is often the last system to charge on a conventional railroad car.

Air from auxiliary reservoir 22 may be used for a variety of air powered applications on an associated railroad car. For example, air from auxiliary reservoir 22 may be used to lower and raise a ramp (not expressly shown) for surface loading vehicles. It may also be used to open discharge doors 39 or other doors on the railroad car. Hatches may also be opened and closed with air from auxiliary reservoir 22. Embodiments of the present disclosure are not limited to the uses listed, but rather any pneumatic system or pneumatically powered component of a railroad car that may use air as a source of power may employ auxiliary reservoir 22 as its air source.

In particular embodiments of the present disclosure, air from auxiliary reservoir 22 may be used to operate discharge doors 39 of railroad car 5. Such operation, may be accomplished by an air system that allows air to travel from auxiliary reservoir 22 in air pipe 24 through check valve 34 to reach door valve 36. Door valve 36 may be a three-position operating door valve that allows air to flow through it to reach door cylinder 38 and either open or close discharge doors 39 of railroad cars.

Operating discharge doors 39 of railroad car 5 from air accumulated in auxiliary reservoir 22 in accordance with an embodiment of the present disclosure may eliminate the need for a separate train line that might otherwise be required to run the length of the train in order to power the individual door cylinders on each individual railroad car. Air accumulated in auxiliary reservoir 22, in accordance with particular embodiments of the present disclosure, may also eliminate the need for wayside air service to operate discharge doors 39 if there is no separate train line.

In addition, a railroad car in accordance with embodiments of the present disclosure may be used in a train without a dedicated train line separate from brake pipe 10 because auxiliary reservoir 22 may allow discharge doors 39 to be operated independent of a separate train line. This may eliminate the need for a train line to extend the full length of the train. For a train line to operate each door system in each car, it must be allowed to extend the full length of the train. In contrast, in accordance with particular embodiments of the present disclosure, a train line may be made to extend a certain length of the train, and still include a car with auxiliary reservoir 22 beyond the end of the dedicated train line with fully operational pneumatic discharge doors 39.

Particular embodiments of the present disclosure may allow a railroad car to be placed in any mix of cars and be transported in any train to a destination while still providing the ability to actuate the car's discharge doors 39 at the destination. Once at the destination, a railroad car in accordance with a particular embodiment of the present disclosure also may be unloaded without being connected to a wayside air supply, which is the current alternative to a dedicated train line for providing air for the operation of discharge doors 39.

A further embodiment of the present disclosure is illustrated in FIG. 2. FIG. 2 illustrates a schematic representation of air brake system 50a in accordance with a particular embodiment of the present disclosure. FIG. 2 illustrates the conventional air brake system of FIG. 1 along with auxiliary reservoir 22. Auxiliary reservoir 22 may be supplied by the air running from brake pipe 10 through control valve 12. Control valve 12 may include port 40 (often referred to as "Port Number 11") from which air may flow to auxiliary reservoir 22 for operation of air powered systems of the railroad car. Many control valves associated with air brake systems on railroad cars include "Port Number 11". Air from control valve 12 may flow through choke 25 and into air pipe 24 to reach auxiliary reservoir 22. Choke 25 may be disposed inside port 40 and may restrict rate of air accumulation in auxiliary reservoir 22. Air pipe 24 may also include a pressure protection valve which functions as described with respect to the embodiment illustrated in FIG. 1.

Air pipe 24 may also have along its length check valve 34 to prevent backflow to control valve 12 from auxiliary reservoir 22. Once auxiliary reservoir 22 is charged by the compressor located on an associated locomotive, auxiliary reservoir 22 may be used to operate a cylinder by the use of an operating valve. For example, door valve 36 may be used to actuate door cylinder 38 in the open and closed directions.

The port 40 may include a fitting (not expressly shown) designed into the casting that forms the service portion of control valve 12. The port 40 may be isolated in control valve 12 so there is no adverse effects on the performance of air brake system 50a in the railroad car when port 40 is tapped to allow air to accumulate in auxiliary reservoir 22.

Port 40 (Port Number 11) may have been included in existing control valve castings to be used in special applications that may require an auxiliary braking system. An auxiliary braking system may be necessary for a particular railroad car that may have six axles instead of the more common railroad car with only four axles. In the instance of the six-axle railroad car, the auxiliary brake system may include an additional brake cylinder. The AAR Manual of Standards and Recommended Practices may govern the use of Port Number 11 to allow air to be taken from the primary brake system to supply an auxiliary brake cylinder. An embodiment of the disclosure incorporating port 40 may allow similar advantages to those discussed with respect to the embodiment which draws air from emergency reservoir 18.

Figure 3:
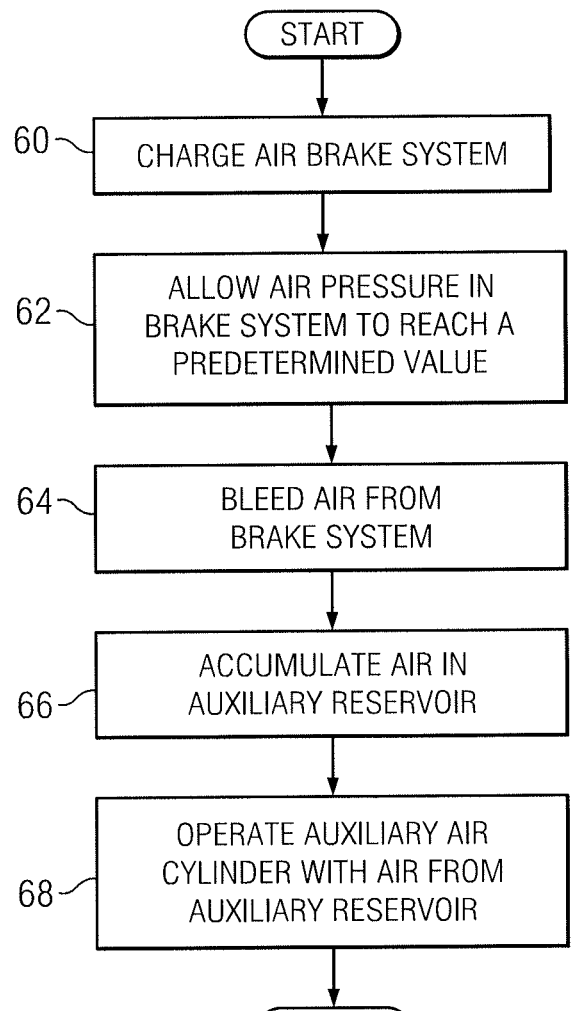
FIG. 3 illustrates a flow diagram of one method to accumulate air in an auxiliary reservoir in accordance with a particular embodiment of the present disclosure.

FIG. 3 is a flowchart illustrating one method for accumulating air in an auxiliary reservoir which may be used to operate an auxiliary cylinder in accordance with a particular embodiment of the present disclosure. The method begins at step 60 where the air brake system of a railroad car is charged. Charging the brake system may be accomplished using an air compressor of an associated locomotive. The brake system may continue to charge as the train runs, provided there is no call for braking. The air brake system may be charged to a point that meets the requirements for an initial terminal test before the train is allowed to begin operation. The initial terminal test may ensure that the air brake system will be operational even though it may not be fully charged.

Air pressure in the brake system may be allowed to reach a predetermined value at step 62. The predetermined value may be seventy-five pounds per square inch (psi). The predetermined value may be a value that is determined by comparing the atmospheric pressure to the pressure of the brake system. In certain embodiments, the pressure in emergency reservoir 18 may be allowed to reach a predetermined value. Pressure protection valve 30 may be incorporated into air pipe 24 to ensure that the predetermined value is reached before air is allowed to travel through pressure protection valve 30 and accumulate in auxiliary reservoir 22.

Once the predetermined value is reached, air from brake reservoir 14 and/or emergency reservoir 18 may be allowed to bleed through pressure protection valve 30 at step 64. In other embodiments, air may be allowed to bleed through port 40 to accumulate in auxiliary reservoir 22. Bleeding of air from emergency reservoir 18 or through port 40 may continue over a period of time during the operation of the train. Air may bleed periodically through pressure protection valve 30 for approximately forty-five minutes before auxiliary reservoir 22 is fully charged.

At step 66, air may accumulate in auxiliary reservoir 22. Air accumulating in auxiliary reservoir 22 may be prevented from back flowing into emergency reservoir 18 by check valve 34. Air may continue to accumulate in auxiliary reservoir 22 as the train continues to move.

Air from auxiliary reservoir 22 may be used to operate an auxiliary cylinder at step 68. An example auxiliary cylinder may be door cylinder 38. The auxiliary cylinder may be any air operated cylinder capable of operating any device on a railroad car that can be operated using air power. Door cylinder 38 may be controlled using door valve 36 which can control air flow into door cylinder 38 to open and close discharge doors 39 of railroad car 5.

Some of the steps illustrated in FIG. 3 may be combined, modified, or deleted where appropriate, and additional steps may also be added to the flowchart. Additionally, steps may be performed in any suitable order without departing from the scope of the disclosure.

Figure 4:
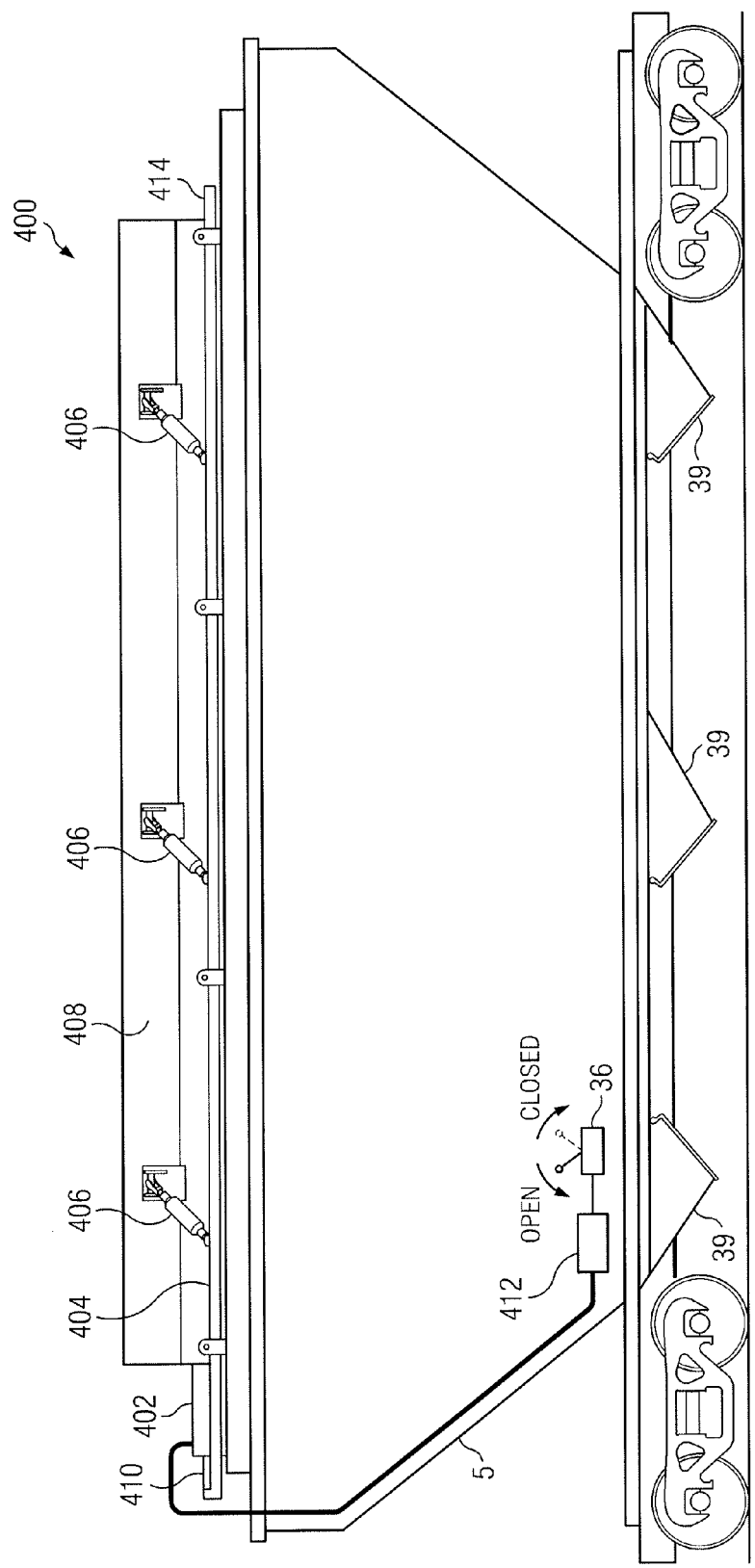
FIG. 4 illustrates a perspective view of a powered remotely controlled hatch system in accordance with particular embodiments of the present disclosure.

FIG. 4 illustrates a powered remotely controlled hatch system 400 in accordance with particular embodiments of the present disclosure. As shown in FIG. 4, system 400 includes actuator 402, common linkage 404, secondary linkage 406, door assembly 408, rod 410, and motor 412. System 400 may be installed and/or used on rail car 5 to open and close one or more door assemblies 408 over hatch 414. Additionally or alternatively, system 400 may also be installed and/or used on rail car 5 to open and close one or more discharge doors 39.

As discussed above, railroad car 5 may be generally described as an open hopper car with one or more bottom discharge doors 39 and/or one or more hatches 414 located on a top surface of railroad car 5. Respective door assemblies 408 may be opened and closed to control discharge and/or lading from discharge doors 39 and/or to allow the loading or unloading of lading into railroad car 5 through hatch 414. However, the present disclosure is not limited to open hopper cars with bottom discharge doors 39 or hatches 414 located on a top surface of railroad car 5.

In particular embodiments of system 400, actuator 402 supplies force to common linkage 404 via rod 410. Actuator 402 may represent an hydraulic actuator, a pneumatic actuator, an electric actuator, a manual actuator (such as, for example, geared drives), and/or any other suitable drive actuator. In particular embodiments, actuator 402 may include a piston that divides the interior of actuator 402 into two variable volume fluid chambers. Rod 410 may be couple to or integrally formed with a piston in actuator 402 and extend in an outwardly direction from actuator 402. Fluid pressure may be applied to one of the chambers and released from or vented from the other chamber to move or reciprocate rod 410. Actuator 402 may be located in any suitable location within or on railroad car 5, including, but not limited to, on a top or bottom surface of railroad car 5. For example, actuator 402 may be located proximate to hatch 414 and/or a center sill of railroad car 5. However, actuator 402 may be formed, located, placed, coupled, or disposed within or on any portion of railroad car 5. In one embodiment, actuator 402 is located proximate to hatch 414 and is coupled to a top surface of railroad car 5.

As discussed above, actuator 402 may represent a hydraulic cylinder. In such embodiments, actuator 402 may be connected to one or more hydraulic, tubes, hoses, and/or pipes that supply fluid to actuator 402. Actuator 402 may derive its motive force from motor 412 that supplies fluid pressure through hydraulic tubing 438 to actuator 402. In some embodiments, motor 412 represents a hydraulic pump powered by compressed air. Motor 412 may represent a double acting, free piston, compressed air driven hydraulic pump of variable delivery. Motor 412 may cycle automatically according to system demand and stall under zero flow conditions with minimal energy consumption. Output flow and pressure may depend upon the intensification ratio relative to the air supply pressure and volume. To receive and exhaust compressed air, motor 412 may include an inlet port and an outlet port. An inlet port may receive compressed air that powers motor 412, and an outlet port may release exhaust air.

Compressed or pressurized air may be supplied to motor 412 in several ways. For example, in some embodiments of system 400, compressed air may be supplied to motor 412 through a train line extending from a reservoir that charges the respective brake system of a railroad car. In such embodiments, compressed air may be communicated to motor 412 through brake pipe 10 extending from brake reservoir 14 and/or an air compressor located on an associated locomotive as described above with respect to FIGS. 1-3. In some embodiments of system 400, compressed air may be supplied to motor 412 through a train line that is not part of the brake system of a railroad car extending from an air compressor located on a locomotive (not expressly shown). Additionally or alternatively, compressed air may be supplied to motor 412 by means of an wayside air supply. In such embodiments, a pipe or hose extending from wayside air supply station may be attached to an inlet port on motor 412 to provide compressed air to motor 412.

In some embodiments, compressed air may be supplied to motor 412 by auxiliary reservoir 22 and communicated to motor 412 through air pipe 24, as described above with respect to FIGS. 1-3. Thus, in accordance with the teachings of the present disclosure, system 400 may open or close door assembly 408 and/or discharge door 39 without a dedicated train line or a wayside air supply to provide operating air to a hydraulic component or components, such as motor 412. Particular embodiments may supply compressed air to motor 412 through a combination of one or more of these methods.

Actuator 402 may be operated with an operating valve. For example, door valve 36 may be used to actuate actuator 402 in the open and closed directions. Door valve 36 may be a three-position operating door valve that allows fluid to flow through it to reach actuator 402, thereby allowing an operator to manually initiate the opening or closing of door assemblies 408 and/or discharge doors 39.

To convey a reciprocating force from actuator 402 to open and close door assembly 408 and/or discharge door 39, particular embodiments of system 400 include common linkage 404 and secondary linkage 406. As shown in FIG. 4, common linkage 404 is oriented along a longitudinal axis of rail car 5 proximate to hatch 414. In some embodiments, common linkage 404 may be attached to a top surface of railroad car 5 by one or more support guides. One or more support guides may be provided to guide the movement of common linkage 404 in a straight-line direction extending away from actuator 402. In some embodiments, common linkage 404 moves in a longitudinal direction relative to railroad car 5. It should be noted however, that common linkage 404 may be oriented in any suitable orientation relative to railroad car 5, such as, for example, in a transverse or oblique orientation. Additionally or alternatively, common linkage 404 may be attached to a bottom surface of railroad car 5 or any other suitable location within or on railroad car 5.

One or more secondary linkages 406 are coupled to common linkage 404 and door assembly 408. Secondary linkages 406 may be rotatably coupled to common linkage 404 and/or door assembly 408 by a respective universal joint, a ball joint, or any other suitable coupling mechanism. In particular embodiments, secondary linkages 406 may rotate in three dimensions, such as longitudinal, lateral, and vertical relative to common linkage 404 and/or door assembly 408 (generally referred to as having a three-degrees of motion mechanical linkage). In some embodiments, secondary linkages 406 may rotate in only two dimensions. Thus, as common linkage 404 moves or reciprocates in a straight-line direction, common linkage 404 pushes or pulls on secondary linkages 406, which in turn push or pull on door assembly 408. Although FIG. 4 illustrates a particular embodiment of system 400 that includes three secondary linkages 406, system 400 may include any appropriate number of secondary linkages 406 suitable to open and close door assembly 408 and/or discharge door 39.

In some embodiments, secondary linkages 406 may include a respective turnbuckle rotatively engaged with threaded portions of secondary linkage 406. Each turnbuckle may be rotated by engaging an appropriate tool (not expressly shown) with a notch or opening in the turnbuckle. Rotating turnbuckles relative to a threaded portions of secondary linkage 406 may extend or retract the length of secondary linkage 406. As a result of rotating a respective turnbuckle, the position of door assemblies 408 in their respective open and/or closed positions may be adjusted. Rotation of turnbuckles allows adjusting the length secondary linkages 406 to provide desired closure of each door assembly 408 and/or discharge door 39 relative to hatch 414 and/or a discharge opening located on a bottom surface of railroad car 5.

Door assembly 408 and/or discharge door 39 represent any suitable covering for hatch 414 and/or other discharge opening. In particular embodiments, door assembly 408 opens and closes to cover and uncover hatch 414. Door assembly 408 and/or discharge door 39 may comprise a steel or other metal alloy plate with edges for receiving a portion of hatch 414 and/or other discharge opening. Door assembly 408 may include a weather-proofing strip disposed around a perimeter of door assembly 408 providing at least a partial seal between the interior of railcar 5 and the exterior environment. In particular embodiments, door assembly 408 is coupled to a top surface of railroad car 5 by one or more hinges. Various types of hinges may be satisfactorily used to engage door assemblies 408 with a top surface of railroad car 5. Examples of such hinges may include, but are not limited to, heavy duty piano type hinges, spring, continuous, butt, slip apart, and/or weld-on hinges. For example, hinges may include flat plate butt hinges that are bolted between respective door assemblies 408 and a top surface of railroad car 5 and/or hatch 414 to accommodate pivotal or rotational movement of door assemblies 408 between an open and closed position.

In some embodiments, door assembly 408 slides in a direction generally perpendicular to a longitudinal axis of railcar 5 along rails grooves, or other fixed pathway on a top surface of railcar 5. In embodiments of system 400 that includes two door assemblies 408, door assemblies 408 may slide in opposite directions toward an outer edge of railcar 5. To open door assembly 408, common linkage 404 may push or pull on secondary linkage 406, which causes door assembly 408 to slide down on one or more grooves in a direction generally away from a center of railroad car 5 and toward an outside edge of railroad car 5. As a result, an interior of railroad car 5 is at least partially exposed. To close door assembly 408, common linkage 404 may push or pull on secondary linkage 406, which causes door assembly 408 to slide up on one or more grooves in a direction generally toward a center of railroad car 5 and toward an outside edge of railroad car 5. Although FIG. 4 illustrates a single door assembly 408, system 400 may include any appropriate number of door assemblies 408.

Figure 5A:
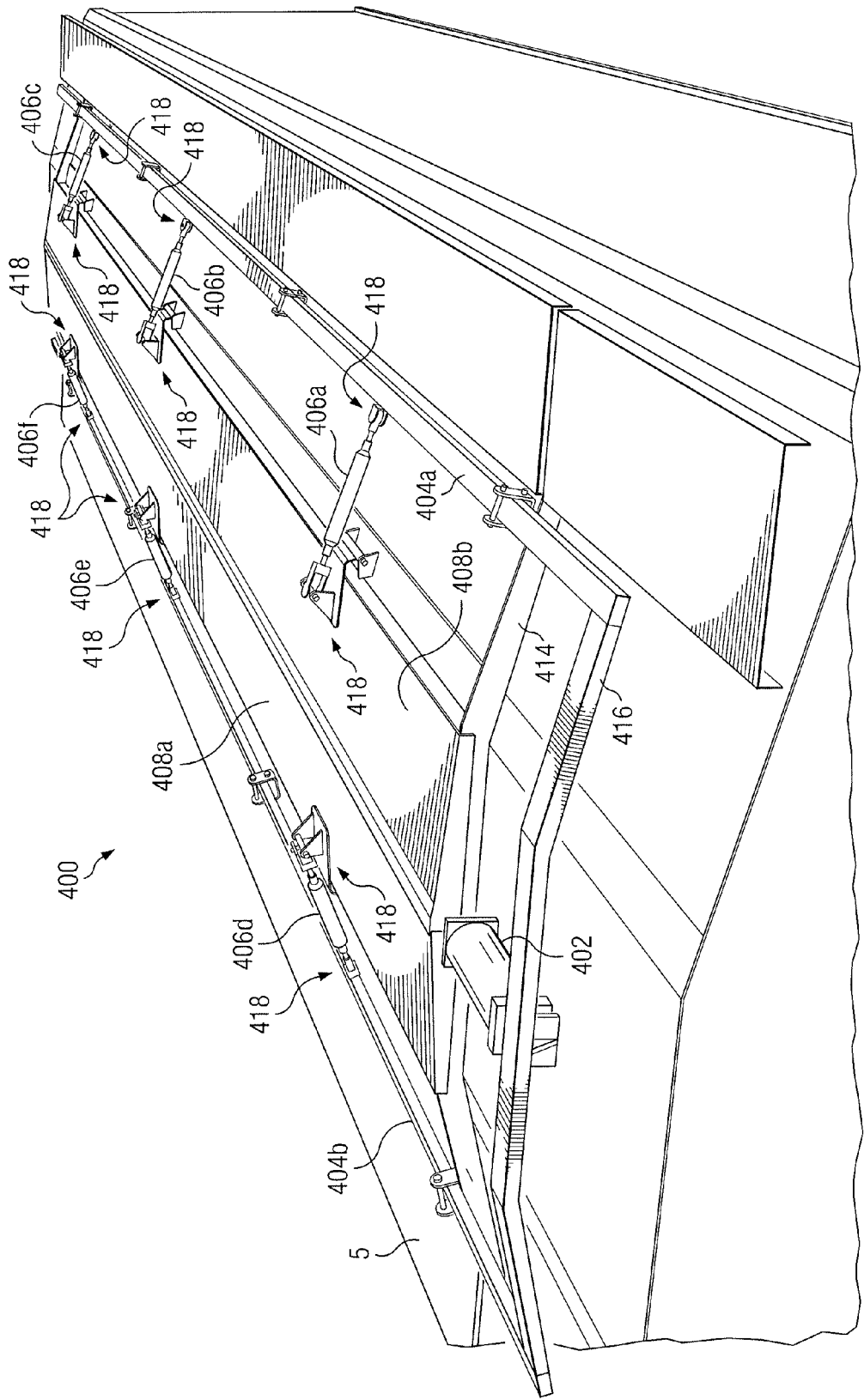
FIGS. 5A-5C illustrate various perspective views of a particular embodiment of a powered remotely controlled hatch system in accordance with the present disclosure.
Figure 5B:
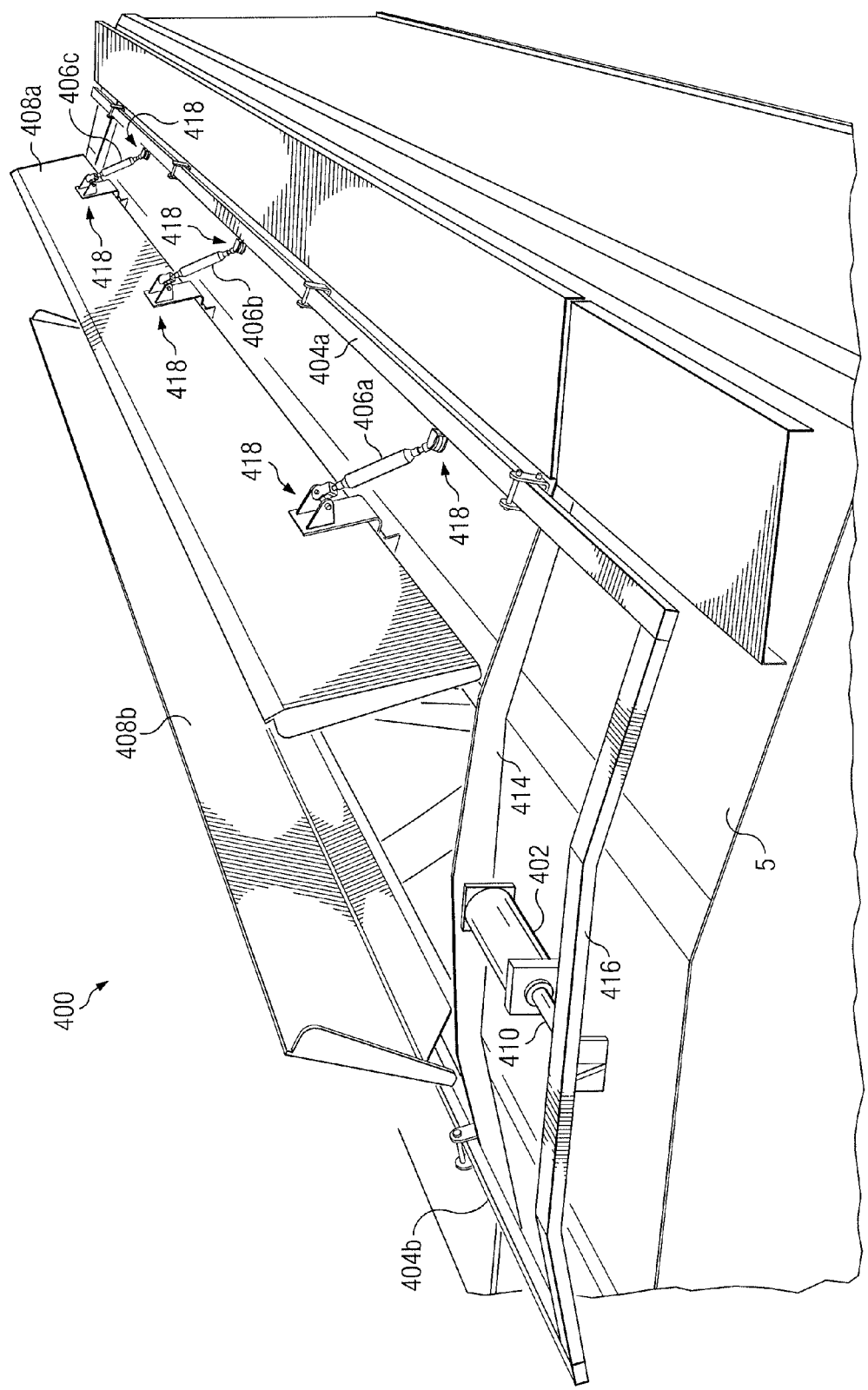
Figure 5C:
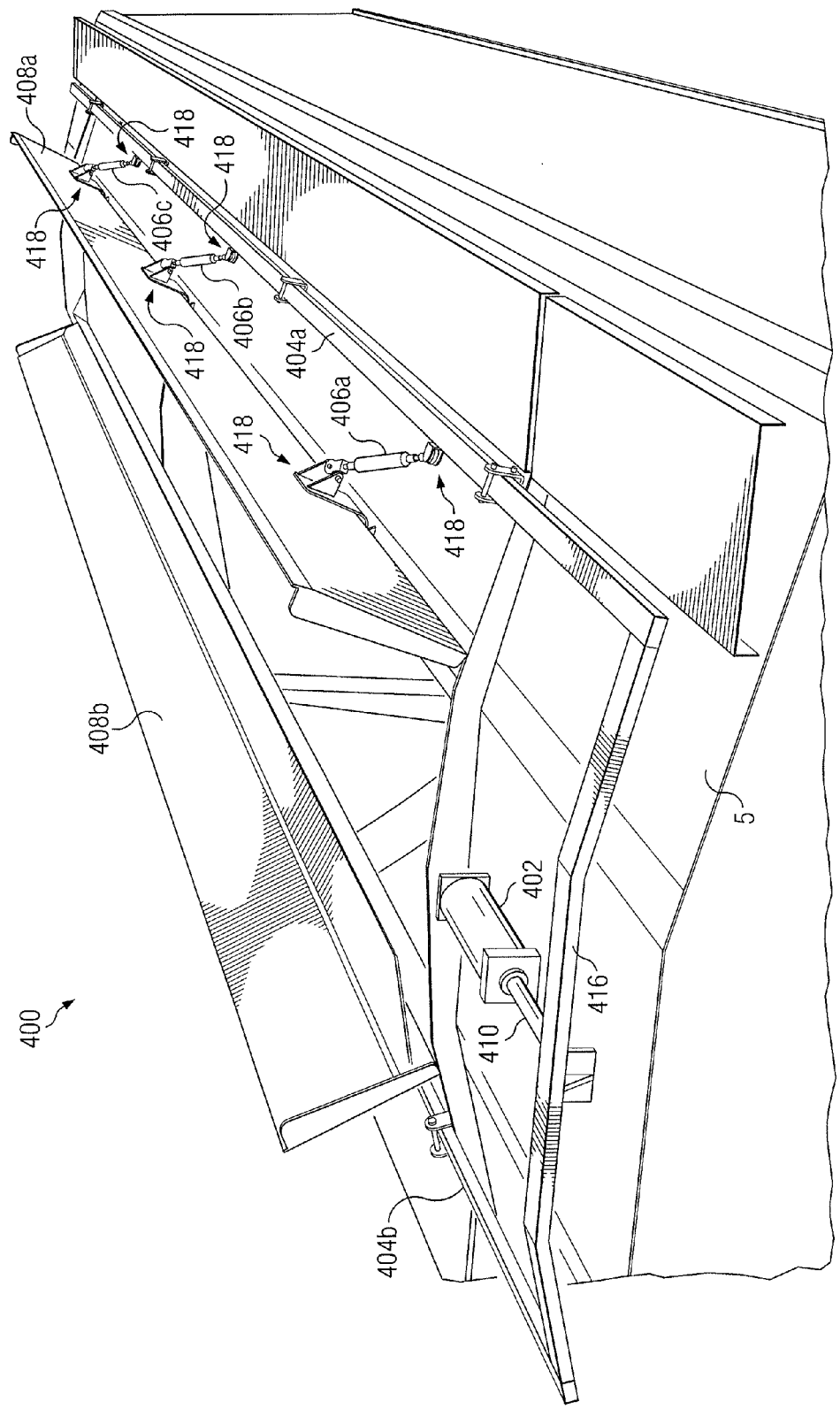

FIGS. 5A-5C illustrate an isometric view of a particular embodiment of powered remotely controlled hatch system 400 at least partially disposed on a top surface of railroad car 5. As shown in FIGS. 5A-5C, system 400 includes actuator 402, common linkages 404a and 404b, secondary linkages 406, door assemblies 408a and 408b, rod 410, bar 416 and joint 418. In some embodiments, common linkages 404a and 404b are positioned on a top surface of railroad car 5 proximate to hatch 414 and generally parallel to a longitudinal axis of railroad car 5. In one embodiment of system 400, actuator 402 is supplied with pressurized hydraulic fluid that powers a piston inside of actuator 402. As discussed above, actuator 402 may be powered by motor 412 (not expressly shown).

In the embodiment illustrated in FIGS. 5A-5C, actuator 402 is positioned proximate to and aligned with an imaginary line approximately bifurcating hatch 414. As shown in FIGS. 5A-5C, upon receiving the requisite hydraulic pressure signal, actuator 402 extends rod 410 outwardly, away from hatch 414 and door assemblies 408a and 408b. Bar 416 is coupled to rod 410 and common linkages 404a and 404b. As a result, movement of rod 410 causes common linkages 404a and 404b to move in the same direction as and parallel to rod 410.

As discussed above with respect to FIG. 4, common linkages 404a and 404b are coupled to secondary linkages 406. The particular embodiment of system 400 illustrated in FIGS. 5A-5C includes secondary linkages 406a, 406b, 406c, 406d, 406e, and 406f. As common linkages 404a and 404b move in response to force supplied by rod 410 and bar 416, secondary linkages 406 push or pull on door assemblies 408a and 408b. As discussed above with respect to FIG. 4, secondary linkages 406 may be coupled to door assemblies 408 by joint 418. In particular embodiments, joint 418 represents a universal joint, ball joint, or other suitable coupling mechanism that allows three-degrees of motion relative to common linkage 404. Thus, as secondary linkages 406 move in response to movement by common linkages 404, each secondary linkage 406 is disposed throughout its respective range of motion at an appropriate angle to push or pull on door assemblies 408a and 408b. Common linkage 404 may also be coupled to secondary linkage 406 by joint 418, which may allow three-degrees of motion relative to common linkage 404. As shown in FIG. 5C, as rod 410 is pushed outwardly by actuator 402 to a maximum extent, door assemblies 408a and 408b are opened to a widest possible extent. As shown in FIG. 5A, as rod 410 is pulled inwardly by actuator 402, door assemblies 408a and 408b are closed to provide a cover over hatch 414.

Figure 6B:
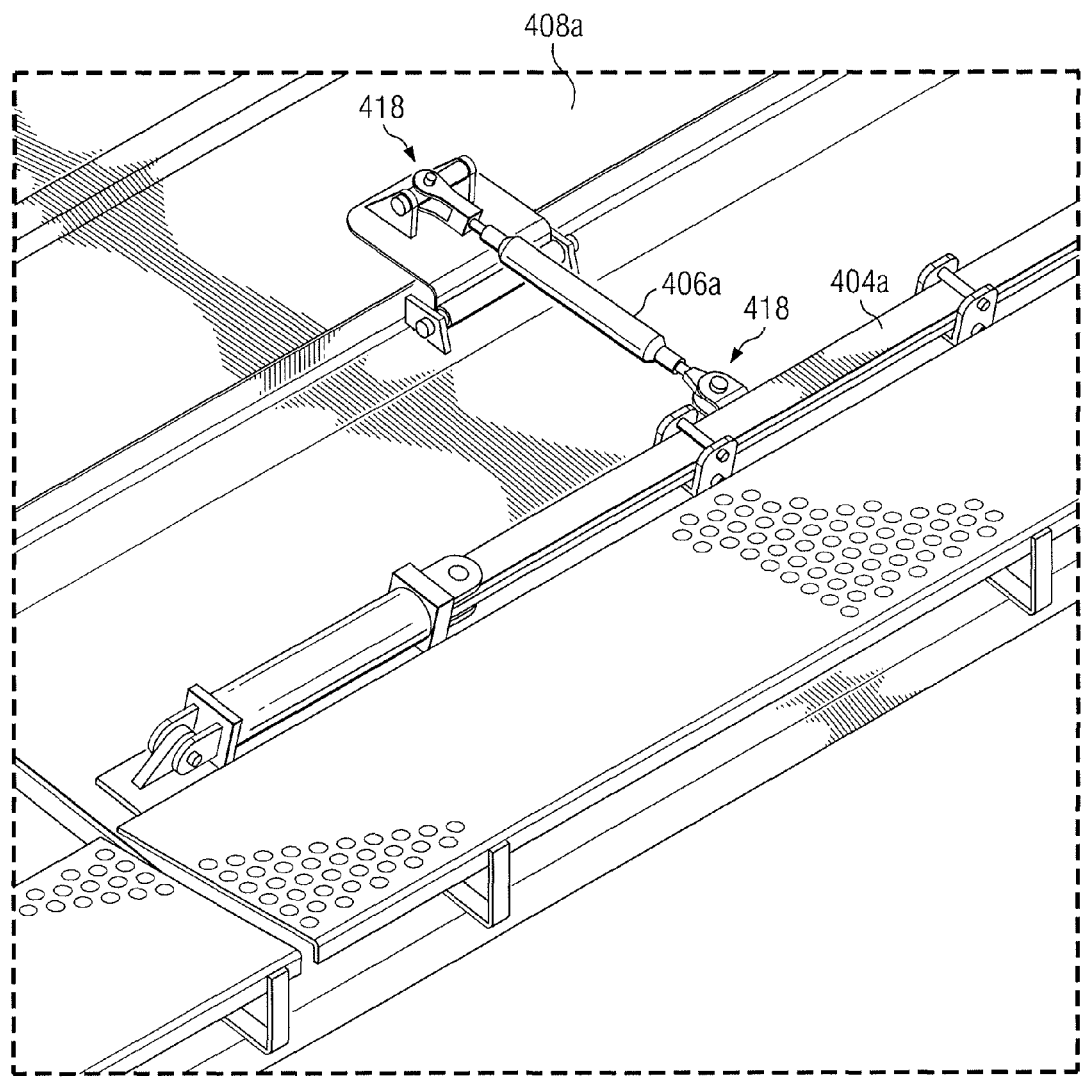
Figure 6C:
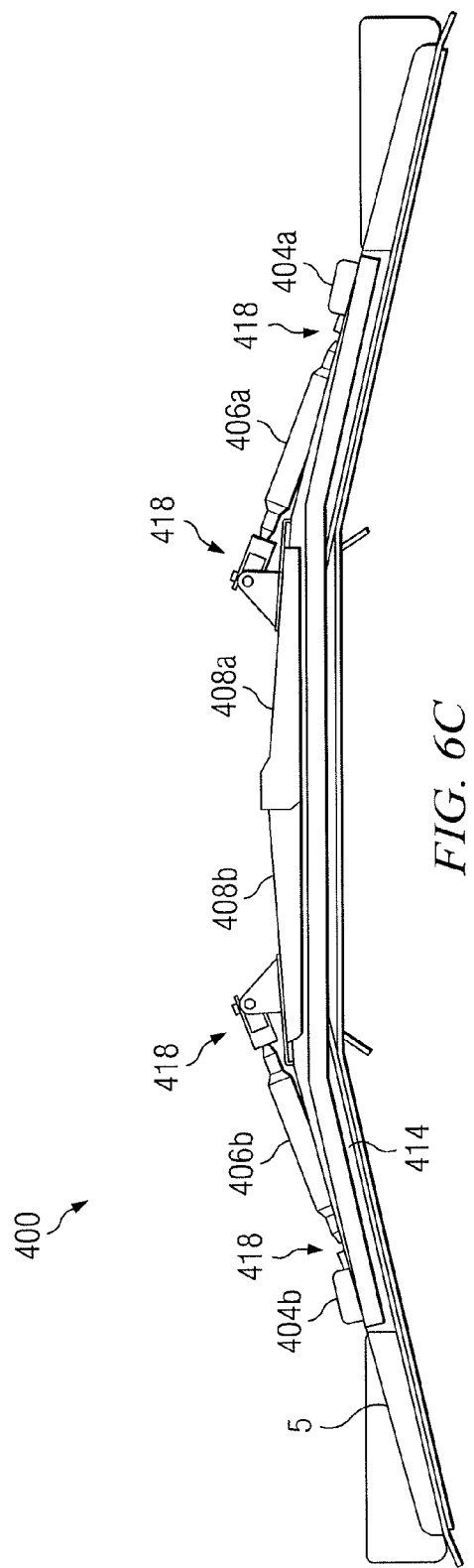

FIGS. 6A-6C illustrate various views of a particular embodiment of powered remotely controlled hatch system 400. FIG. 6A illustrates an isometric view of a top surface of railroad car 5 in which door assemblies 408a and 408b are in a closed position over hatch 414. As shown in FIG. 6A, system 400 includes common linkages 404a and 404b disposed parallel to each other and proximate to hatch 414. In one embodiment, common linkages 404a and 404b are positioned on a top surface of railroad car 5 generally parallel to a longitudinal axis of railroad car 5. In the embodiment shown in FIGS. 6A-6C, common linkages 404a and 404b are coupled to a plurality of secondary linkages 406. Secondary linkages 406 are each coupled to door assemblies 408 by joint 418. As discussed above, joint 418 may represent a universal joint, a ball joint, or any other suitable coupling mechanism that allows three-degrees of motion relative to common linkage 404. Common linkage 404 may also be coupled to secondary linkage 406 by joint 418, which may allow three-degrees of motion relative to common linkage 404. In the embodiment shown in FIGS. 6A-6C, system 400 includes actuators 402a and 402b. Each actuator 402 may independently and/or separately move or reciprocate a respective common linkage 404. As an example, actuator 402a may move or reciprocate common linkage 404a, and actuator 402b may move or reciprocate common linkage 404b. Actuators 402a and 402b may be powered by pressurized hydraulic fluid supplied by a common motor 412 or separate motors 412 (not expressly shown).

FIG. 6B illustrates the dotted-line region of FIG. 6A in greater detail. FIG. 6B illustrates common linkage 404a coupled to secondary linkage 406a. Secondary linkage 406a is coupled to door assembly 408a by joint 418. Joint 418 coupling secondary linkage 406a to door assembly 408 and/or common linkage 404 represents a universal joint. However, in particular embodiments, joint 418 may represent any appropriate coupling mechanism that allows angular motion of secondary linkage 406 relative to common linkage 404 and/or door assembly 408.

FIG. 6C illustrates a cross-sectional end view of a top surface of railroad car 5. As shown in FIG. 6C, door assemblies 408a and 408b are in a closed position over hatch 414. Common linkage 404a is coupled to secondary linkage 406a, and common linkage 404b is coupled to secondary linkage 406b. Secondary linkages 406a and 406b are each coupled to a respective joint 418 on door assemblies 408 and/or common linkage 404.

Figure 7B:
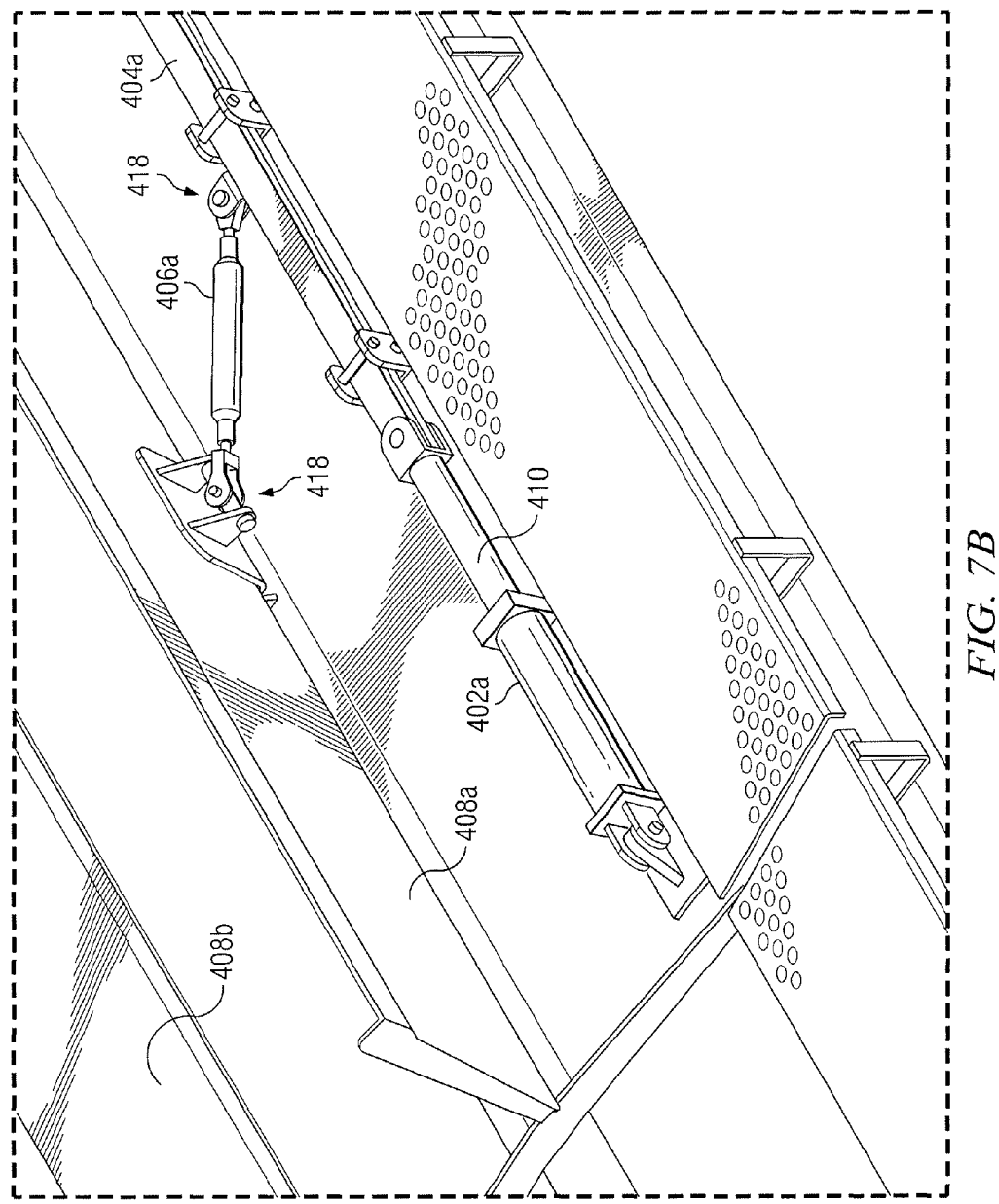
Figure 7C:
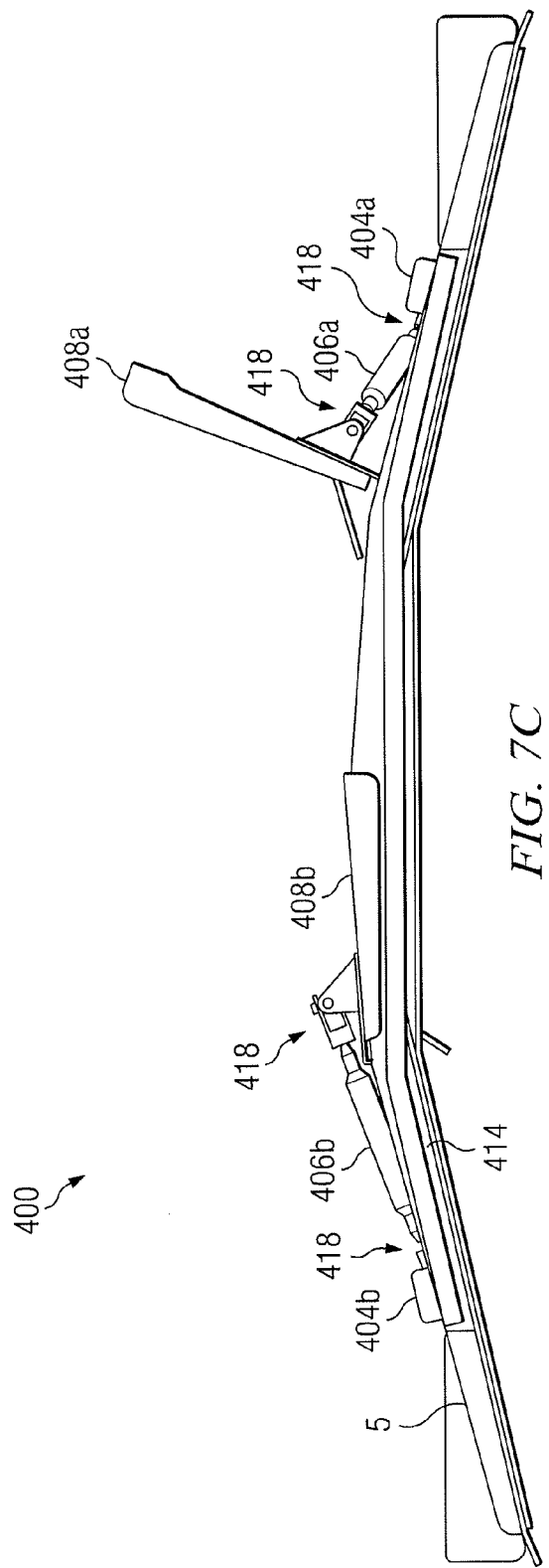

FIGS. 7A-7C illustrate various views of a particular embodiment of powered remotely controlled hatch system 400. FIG. 7A illustrates an isometric view of a top surface of railroad car 5 in which door assembly 408a is in an open position and door assembly 408b is in a closed position over hatch 414. As shown in FIG. 7A, system 400 includes common linkages 404a and 404b disposed parallel to each other and proximate to hatch 414. In particular embodiments, common linkages 404a and 404b are arranged parallel to each other and parallel to a longitudinal axis of railroad car 5. In the embodiment shown in FIGS. 7A-7C, common linkages 404a and 404b are coupled to a plurality of secondary linkages 406. Secondary linkages 406 are each coupled to door assemblies 408 and/or common linkages 404 by joint 418. As discussed above, joint 418 may represent a universal joint, a ball joint, or any other suitable coupling mechanism that allows angular motion relative to common linkage 404 and/or door assembly 408. In the embodiment shown in FIGS. 7A-7C, system 400 includes actuator 402a and 402b. Each actuator 402 may independently and/or separately move or reciprocate common linkage 404. As an example, actuator 402a may move or reciprocate common linkage 404a, and actuator 402b may move or reciprocate common linkage 404b. Actuators 402a and 402b may be powered by pressurized hydraulic fluid supplied by a common motor 412 or separate motors 412 (not expressly shown). As shown in FIGS. 7A-7C, actuator 402a is partially extending rod 410, thus causing common linkage 404a to extend in a straight-line direction away from actuator 402a. Common linkage 404a is coupled to secondary linkages 406a, 406b, and 406c by joints 418. Secondary linkages 406a, 406b, and 406c are each coupled to door assembly 408a by joints 418. As a result, as rod 410 extends and pushes on common linkage 404a, secondary linkages 406 pull on door assembly 408a, causing door assembly 408a to articulate about hinges that couple door assembly 408a to railroad car 5. Door assembly 408a is thereby moved to an open position that at least partially exposes the interior of railroad car 5.

FIG. 7B illustrates the dotted-line region of FIG. 7A in greater detail. FIG. 7B illustrates common linkage 404a coupled to secondary linkage 406a. As discussed above with respect to FIG. 7A, actuator 402a is partially extending rod 410, which moves or reciprocates common linkage 404a in a straight-line direction away from actuator 402a. Common linkage 404a is coupled to secondary linkage 406a. Secondary linkage 406a is coupled to door assembly 408a and/or common linkage 404a by joint 418. Joint 418 shown in FIG. 7B represents a universal joint. However, in particular embodiments, joint 418 may represent any appropriate coupling mechanism that allows angular motion relative to common linkage 404a and/or door assembly 408a. As a result of actuator 402a extending rod 410, common linkage 404a pulls on secondary linkages 406a, 406b, and 406c (not expressly shown), which in turn pull on door assembly 408a. As a result, door assembly 408a is moved to an open position over hatch 414.

FIG. 7C illustrates a cross-sectional end view of a top surface of railroad car 5. As shown in FIG. 7C, door assembly 408*a* is in an open position over hatch 414 and door assembly 408*b* is in a closed position over hatch 414. Common linkage 404*a* is coupled to secondary linkage 406*a*, and common linkage 406*b* is coupled to secondary linkage 404*b*. Secondary linkages 404*a* and 404*b* are each coupled to common linkages 404*a* and 404*b* and door assemblies 408*a* and 408*b* by respective joints 418.

Figure 8A:
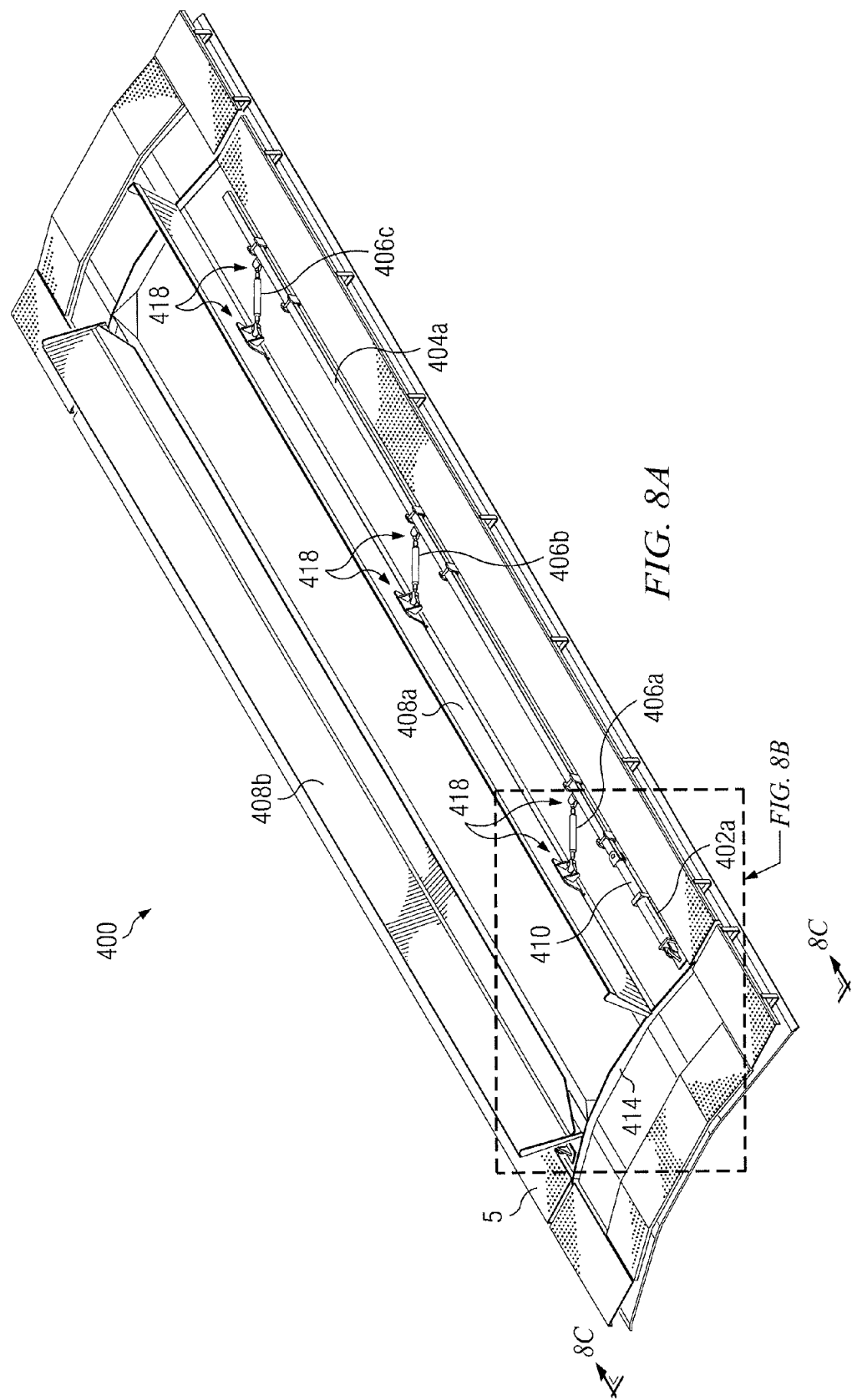
FIGS. 8A-8C illustrate various perspective views of a particular embodiment of a powered remotely controlled hatch system in accordance with the present disclosure in which door assemblies are in an open position.
Figure 8B:
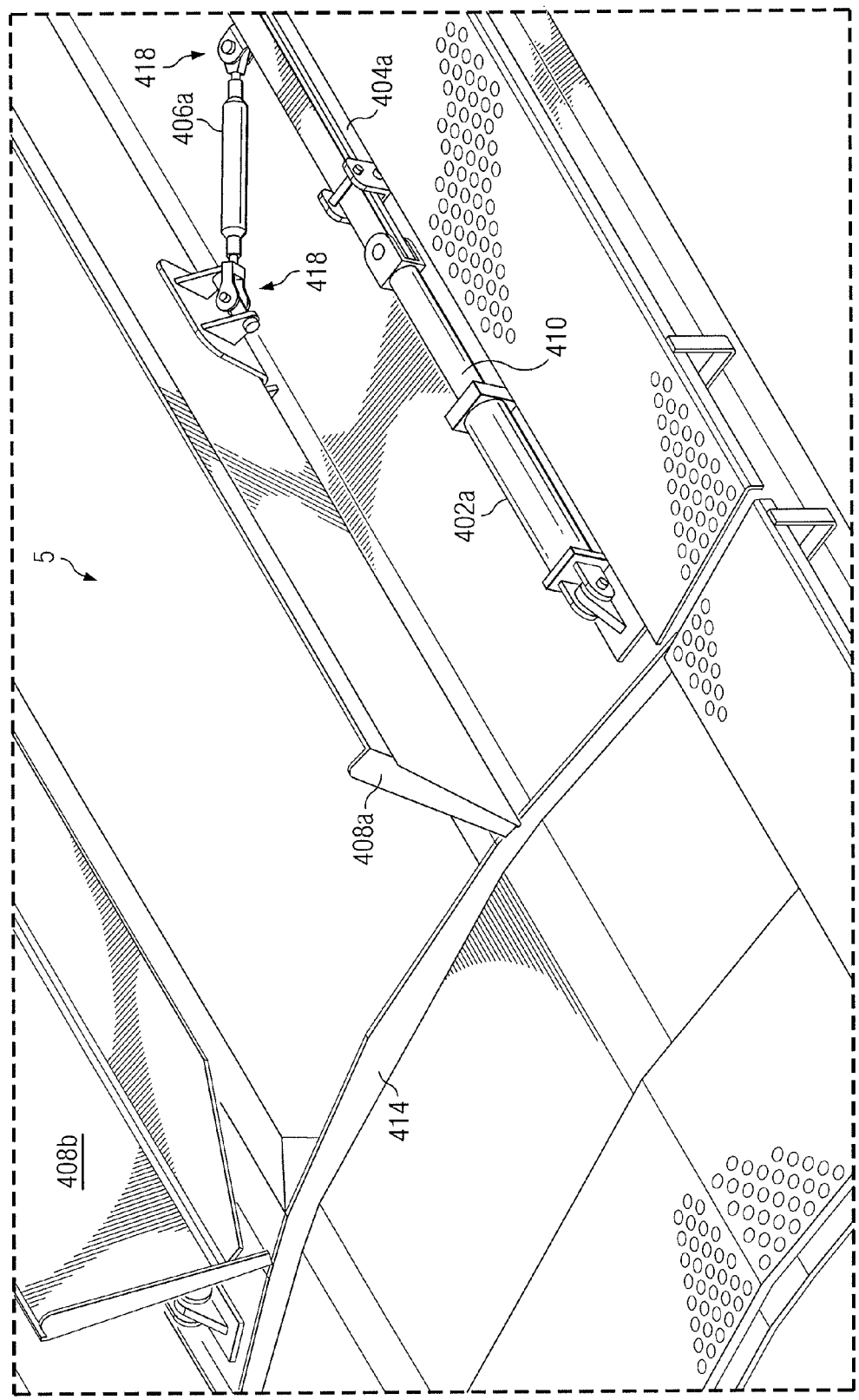
Figure 8C:
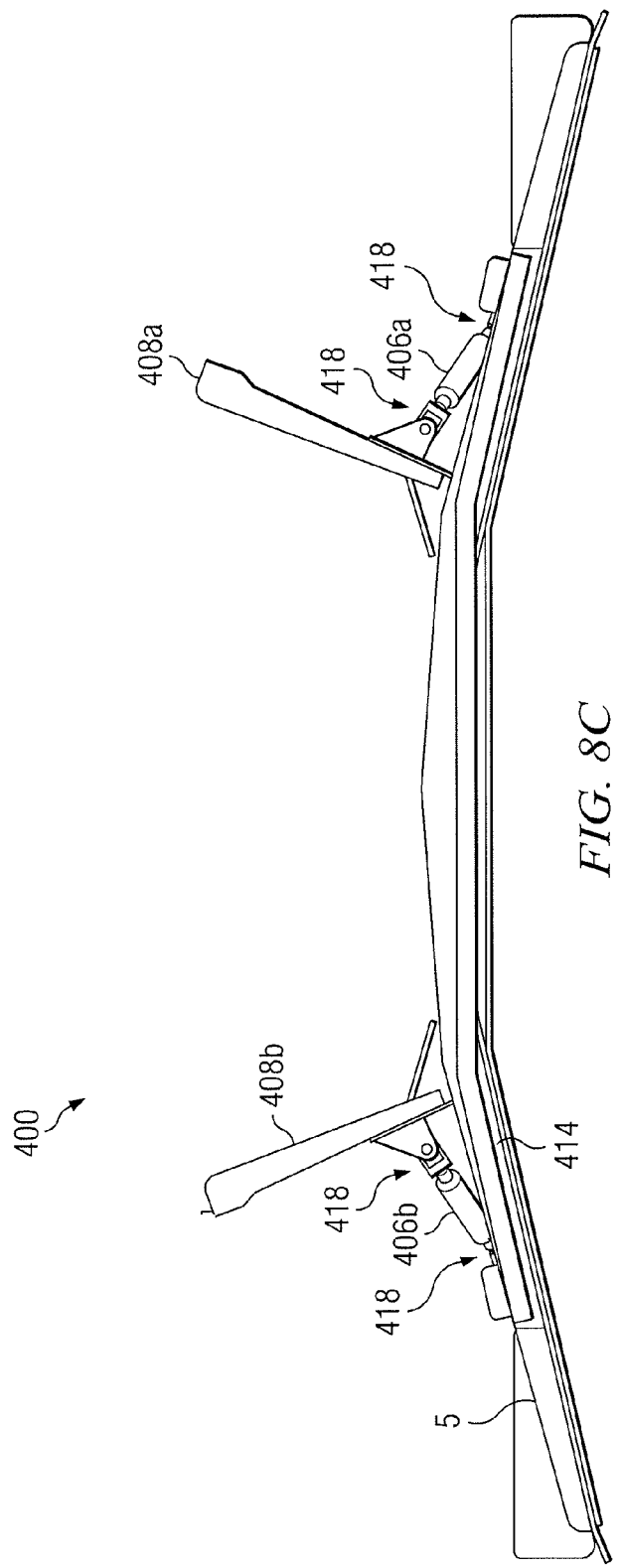

FIGS. 8A-8C illustrate various views of a particular embodiment of powered remotely controlled hatch system 400. FIG. 8A illustrates an isometric view of a top surface of railroad car 5 in which door assemblies 408*a* and 408*b* are in an open position over hatch 414, thereby at least partially exposing the interior of railroad car 5. As shown in FIG. 8A, system 400 includes common linkages 404*a* and 404*b* disposed parallel to each other and proximate to hatch 414. Common linkages 404*a* and 404*b* are arranged in a longitudinal orientation relative to railroad car 5. In the embodiment shown in FIGS. 8A-8C, common linkages 404*a* and 404*b* are coupled to a plurality of secondary linkages 406. Secondary linkages 406 are each coupled to door assemblies 408 by joint 418. As discussed above, joint 418 may represent a universal joint, a ball joint, or any other suitable coupling mechanism that allows three-degrees of motion relative to common linkage 404. In the embodiment shown in FIGS. 8A-8C, system 400 includes actuator 402*a* and 402*b*. Each actuator 402 may independently and/or separately control or reciprocate common linkage 404. As an example, actuator 402*a* may control or reciprocate common linkage 404*a*, and actuator 402*b* may control or reciprocate common linkage 404*b*. Actuators 402*a* and 402*b* may be powered by pressurized hydraulic fluid supplied by a common motor 412 or separate motors 412 (not expressly shown). As shown in FIGS. 8A-8C, actuators 402*a* and 402*b* are each partially extending a respective rod 410, thus causing common linkage 404*a* and 404*b* to extend in a straight-line direction away from respective actuators 402*a* and 402*b*. Common linkage 404*a* is coupled to secondary linkages 406*a*, 406*b*, and 406*c*, which are each coupled to door assembly 408*a* by joints 418. Common linkage 404*b* is coupled to secondary linkages 406*d*, 406*e*, and 406*f* (not expressly shown) by joints 418. Secondary linkages 406*d*, 406*e*, and 406*f* are each coupled to door assembly 408*a* by joints 418. As a result, as rods 410 extend and push on common linkages 404*a* and 404*b*, secondary linkages 406 pull on door assemblies 408*a* and 408*b*, causing door assemblies 408*a* and 408*b* to articulate about hinges that couple door assemblies 408*a* and 408*b* to railroad car 5. Door assemblies 408*a* and 408*b* are thereby moved to an open position that at least partially exposes the interior of railroad car 5.

FIG. 8B illustrates the dotted-line region of FIG. 8A in greater detail. FIG. 8 illustrates common linkage 404*a* coupled to secondary linkage 406*a*. As discussed above with respect to FIG. 8A, actuator 402*a* is extending rod 410, which moves or reciprocates common linkage 404*a* in a straight-line direction away from actuator 402*a*. Common linkage 404*a* is coupled to secondary linkage 406*a*. Secondary linkage 406*a* is coupled to door assembly 408*a* and/or common linkage 404*a* by joint 418. Joint 418 shown in FIG. 8B represents a universal joint. However, in particular embodiments, joint 418 may represent any appropriate coupling mechanism that allows angular motion relative to common linkage 404*a* and/or door assembly 408*a*. As a result of actuator 402*a* extending rod 410, common linkage 404*a* pulls on secondary linkages 406*a*, 406*b*, and 406*c* (not expressly shown), which in turn pull on door assembly 408*a*. As a result, door assembly 408*a* is in a open position over hatch 414. Similarly, door assembly 408*b* is moved into a open position over hatch 414 as actuator 402*b* extends rod 410, which moves common linkage 404*b* in a straight-line direction away from actuator 402*b*.

FIG. 8C illustrates a cross-sectional end view of a top surface of railroad car 5. As shown in FIG. 8C, door assemblies 408*a* and 408*b* are each in an open position over hatch 414. Common linkage 404*a* is coupled to secondary linkage 404*a*, and common linkage 404*b* is coupled to secondary linkage 404*b*. Secondary linkages 406*a* and 406*b* are each coupled to door assemblies 404*a* and 404*b* and common linkages 404*a* and 404*b* by a respective joint 418. Actuators 402*a* and 402*b* are each extending a respective rod 410, which in turn moves or reciprocates common linkages 404*a* and 404*b*. Movement of common linkages 404*a* and 404*b* causes secondary linkages 406*a* and 406*b* to pull on door assemblies 408*a* and 408*b*, thereby moving door assemblies 408*a* and 408*b* into an open position over hatch 414.

Figure 9A:
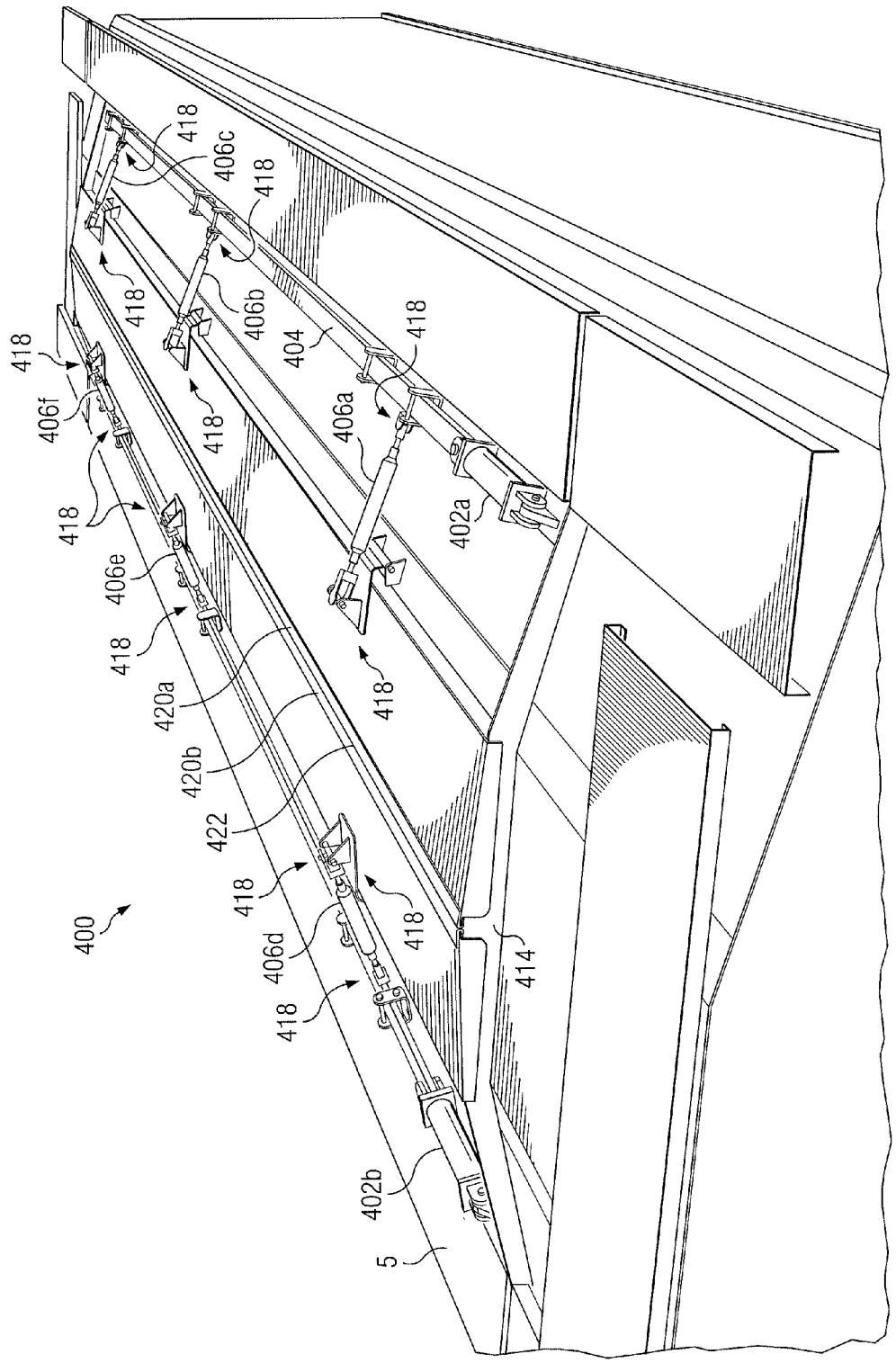
FIGS. 9A and 9B illustrate various perspective views of a particular embodiment of a powered remotely controlled hatch system including two door assemblies and a lip seal.
Figure 9B:
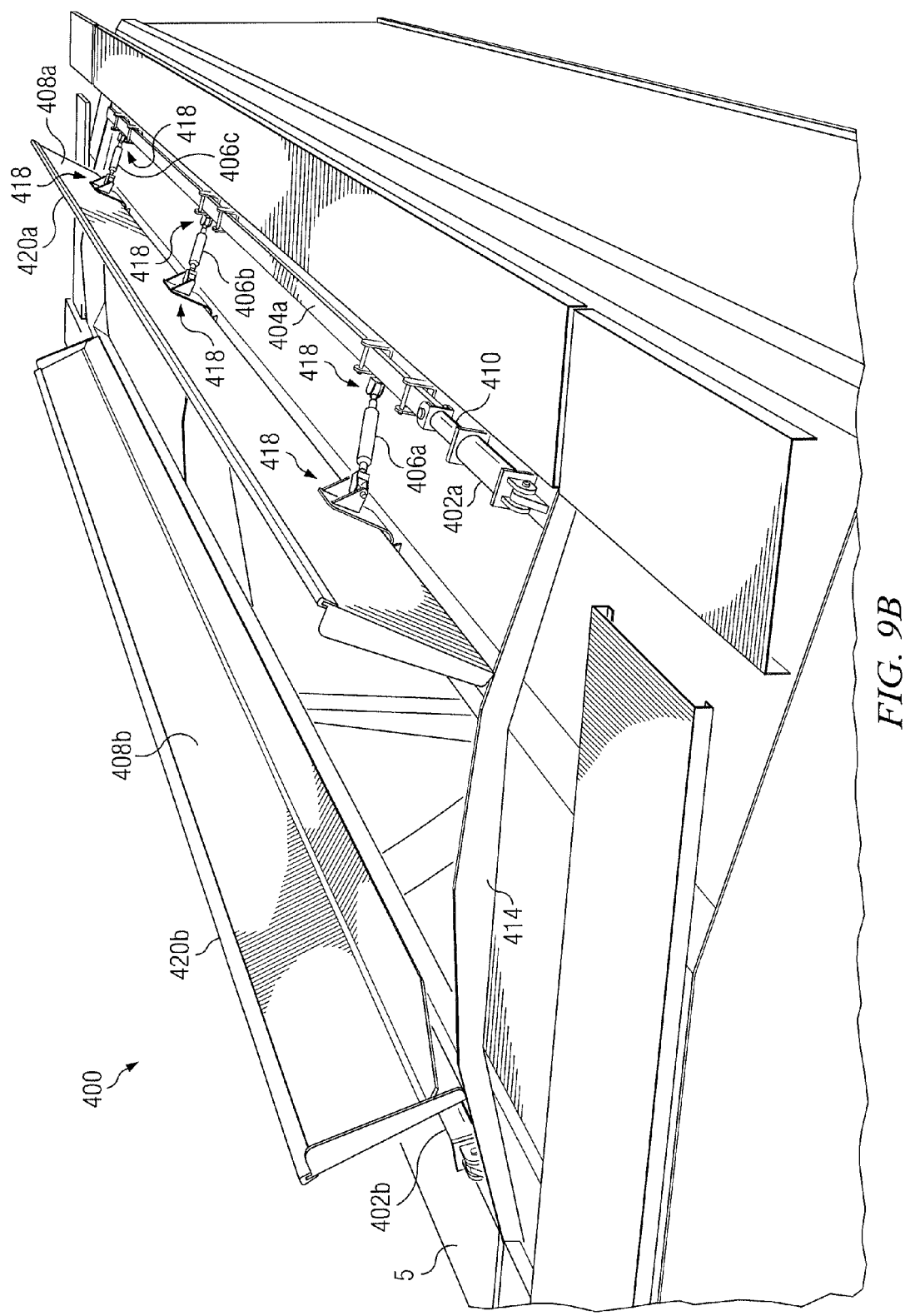

FIGS. 9A, 9B, 10A-10C, and 11A and 11B illustrate various embodiments of powered remotely controlled hatch system 400 disposed on a top surface of railroad car 5. FIGS. 9A and 9B illustrate an embodiment of system 400 that includes two door assemblies 408 (which may be referred to as a "double door" assembly) and lip seal 422. As shown in FIGS. 9A and 9B, system 400 includes actuators 402*a* and 402*b* and common linkages 404*a* and 404*b*. Common linkage 404*a* is coupled to secondary linkages 406*a*, 406*b*, and 406*c* by a respective joint 418. Secondary linkages 406*a*, 406*b*, and 406*c* are each coupled to door assembly 408*a* by a respective joint 418. Common linkage 404*b* is coupled to secondary linkages 406*d*, 406*e*, and 406*f* by a respective joint 418. Secondary linkages 406*d*, 406*e*, and 406*f* are each coupled to door assembly 408*b* by a respective joint 418. Particular embodiments of system 400, however, may include any appropriate number and/or configuration of common linkages 404 and/or secondary linkages 406. In the embodiment of system 400 shown in FIGS. 9A and 9B, door assembly 408*a* includes edge portion 420*a* and door assembly 408*b* includes edge portion 420*b*. In particular embodiments, edge portions 420*a* and 420*b* may represent a rubberized or other weather-proof strip of material attached to door assembly 408. When door assemblies 408 are in a closed position, as illustrated in FIG. 9A for example, edge portions 420*a* and 420*b* abut against each other, thereby forming lip seal 422. As a result, door assemblies 408 seal the interior of railroad car 5 in a closed position, thereby protecting the contents of railroad car 5 from weather, debris, and/or other undesirable elements.

FIG. 9B illustrates the double door assembly shown in FIG. 9A. As shown in FIG. 9B, system 400 includes door assemblies 408*a* and 408*b* in an open position. Door assemblies 408*a* and 408*b* include edge portions 420*a* and 420*b*, respectively. As discussed above, actuators 402*a* and 402*b* extend rods 410, which move or reciprocate common linkages 404*a* and 404*b* (not expressly shown), respectively. Actuators 402*a* and 402*b* may operate separately and independently, or may operate simultaneously. For example, actuator 402*a* may move door assembly 408*a* into an open position, while door assembly 408*b* remains in a closed position. In an open position, system 400 allows access to the interior of railroad car 5, thereby allowing the loading and/or unloading of lading through hatch 414.

Figure 10A:
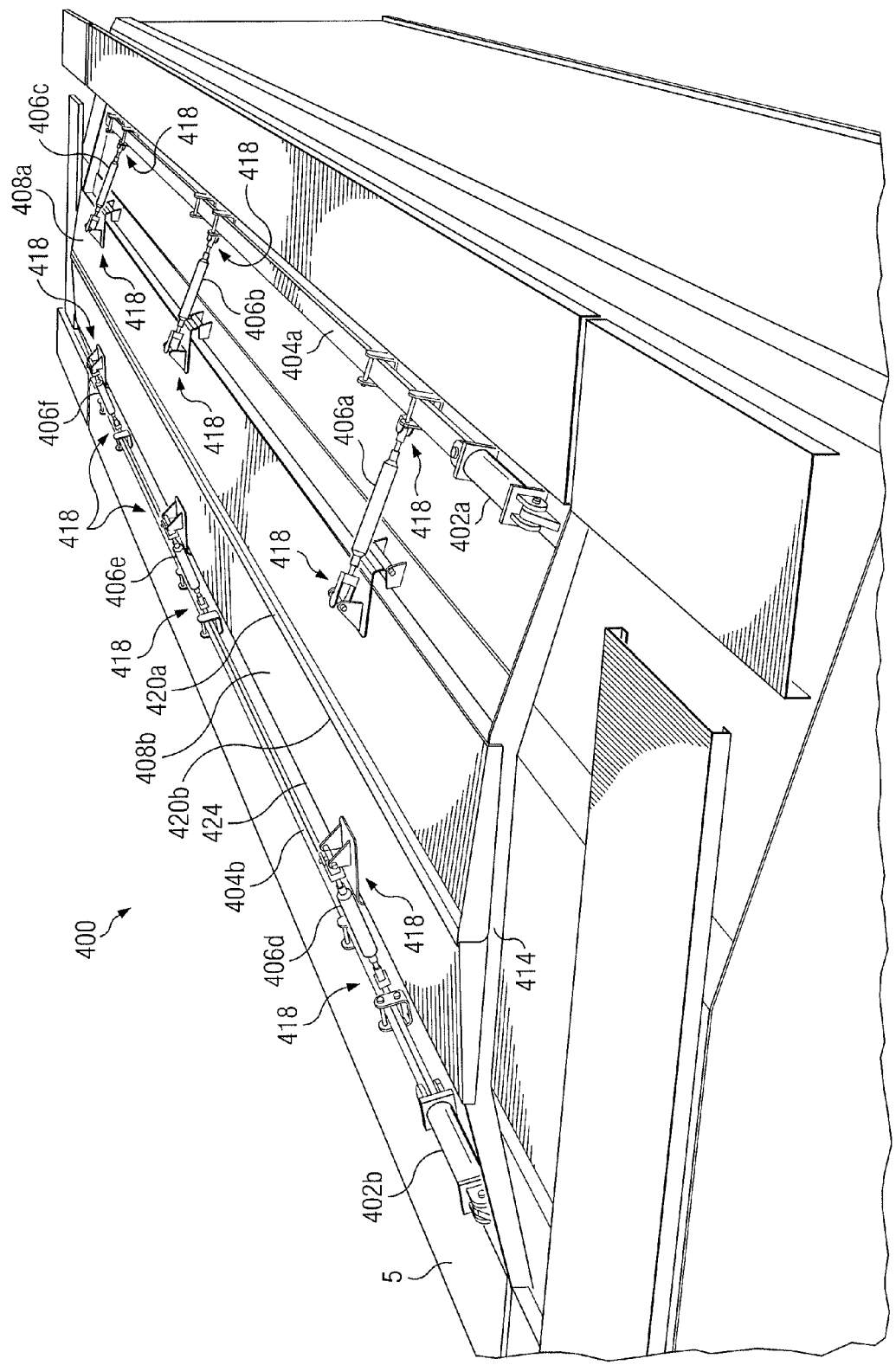
FIGS. 10A-10C illustrate various perspective views of a particular embodiment of a powered remotely controlled hatch system including two door assemblies and an overlap seal.
Figure 10B:
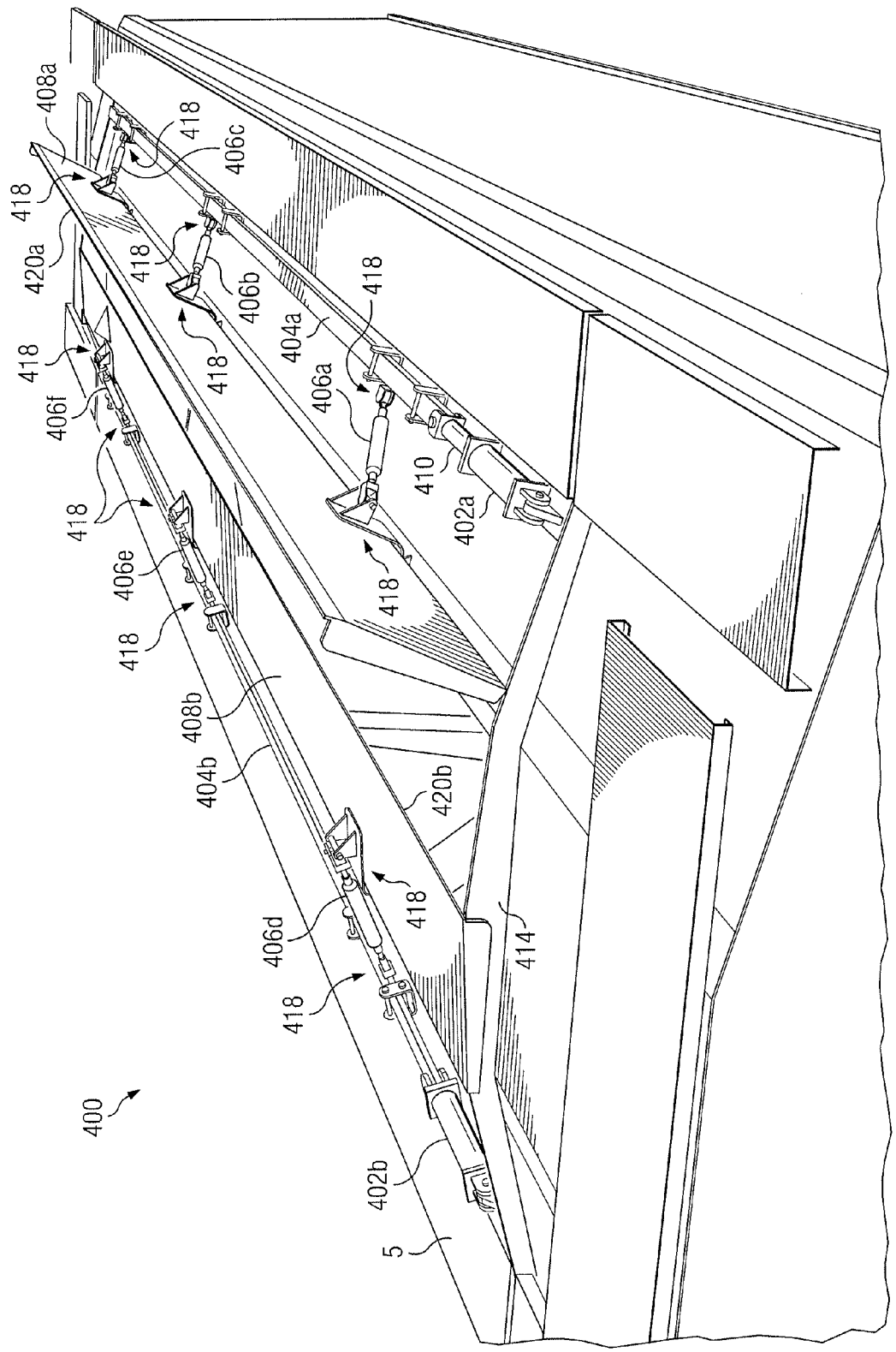
Figure 10C:
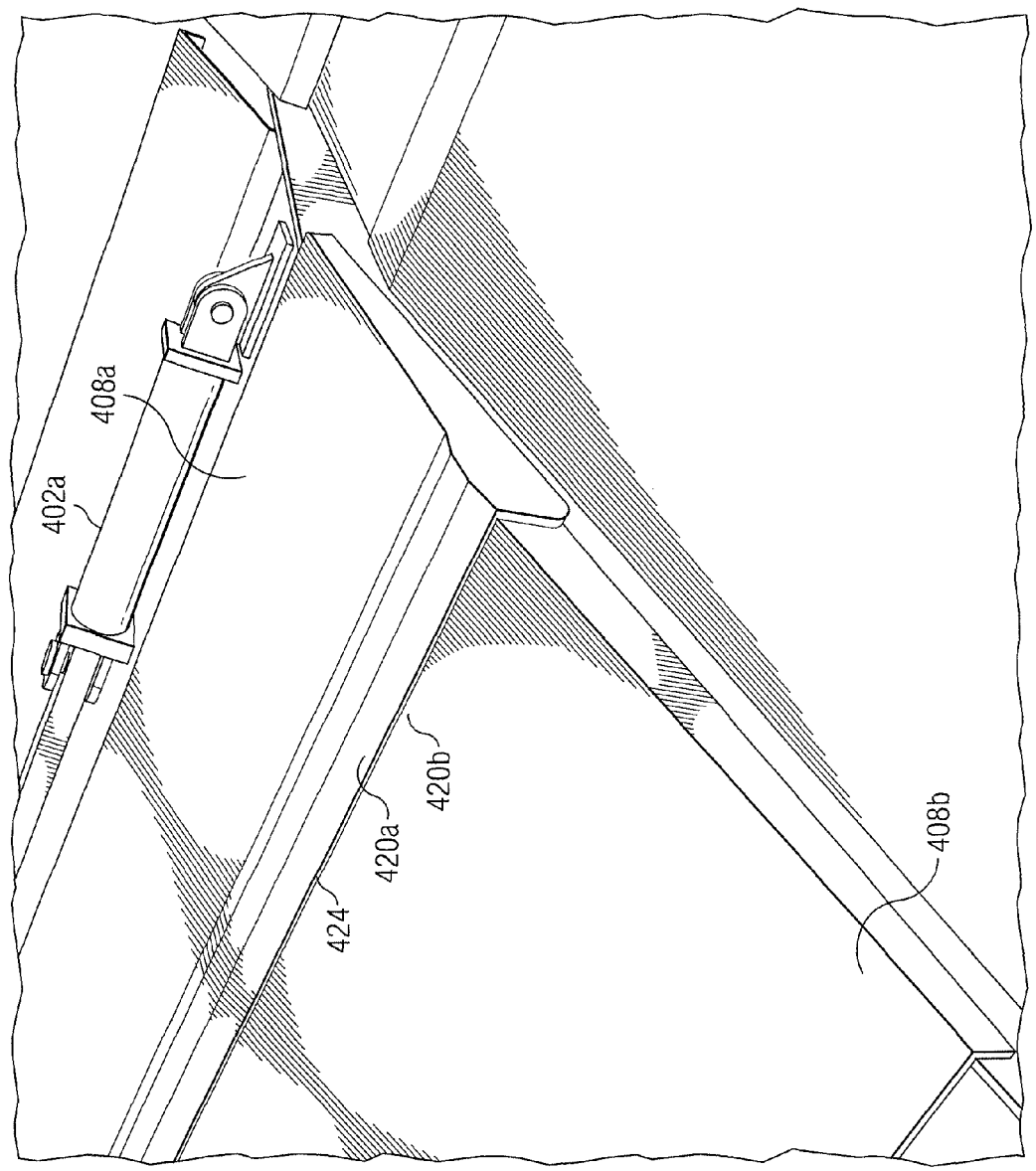

FIGS. 10A-10C illustrate an embodiment of powered remotely controlled hatch system 400 that includes two door assemblies 408 (which may be referred to as a "double door assembly") and overlap seal 424. As shown in FIGS. 10A-10C, system 400 includes actuators 402*a* and 402*b* and common linkages 404*a* and 404*b*. Common linkage 404*a* is coupled to secondary linkages 406*a*, 406*b*, and 406*c* by a respective joint 418. Secondary linkages 406*a*, 406*b*, and 406*c* are each coupled to door assembly 408*a* by a respective joint 418. Common linkage 404*b* is coupled to secondary linkages 406*d*, 406*e*, and 406*f* by a respective joint 418. Secondary linkages 406*d*, 406*e*, and 406*f* are each coupled to door assembly 408*b* by a respective joint 418. Particular embodiments of system 400, however, may include any appropriate number and/or configuration of common linkages 404 and secondary linkages 406. In the embodiment of system 400 shown in FIGS. 10A-10C, door assembly 408*a* includes edge portion 420*a* and door assembly 408*b* includes edge portion 420*b*. In particular embodiments, when door assemblies 408*a* and 408*b* are each in a closed position, edge portion 420*a* may overlap and/or cover edge portion 420*b*, thereby forming overlap seal 422. As a result, door assemblies 408 seal the interior of railroad car 5 in a closed position, thereby protecting the contents of railroad car 5 from weather, debris, and/or other undesirable elements. Moreover, door assembly 408*b* may be configured to close prior to door assembly 408*a* so that edge portion 408*a* overlaps or covers edge portion 408*b*. Edge portions 408*a* and 408*b* may comprise any suitable material, such as, for example, rubberized or weather-proof material, appropriate to form overlap seal 424.

FIG. 10B illustrates the double door assembly shown in FIG. 10A. As shown in FIG. 10B, discharges control system 400 includes door assembly 408*a* in an open position and door assembly 408*b* in a closed position. Door assemblies 408*a* and 408*b* include edge portions 420*a* and 420*b*, respectively. As discussed above, actuators 402*a* and 402*b* extend rods 410, which move or reciprocate common linkage 404*a* and 404*b* (not expressly shown) respectively. Actuators 402*a* and 402*b* may operate separately and independently, or may operate simultaneously. For example, actuator 402*a* may move door assembly 408*a* into an open position, while door assembly 408*b* remains in a closed position. In an open position, system 400 allows access to the interior of railroad car 5, thereby allowing the loading and/or unloading of lading through hatch 414.

FIG. 10C illustrates a magnified view of the door assemblies 408*a* and 408*b* illustrated in FIGS. 10A and 10B. As shown in FIG. 10C, door assemblies 408*a* and 408*b* include edge portions 420*a* and 420*b*. When door assemblies 408*a* and 408*b* are in a closed position, edge portions 420*a* and 420*b* form overlap seal 424. Overlap seal 424 may operate to seal the interior of railroad car 5, thereby protecting the contents of railroad car 5 from weather, debris, and/or other undesirable elements.

Figure 11A:
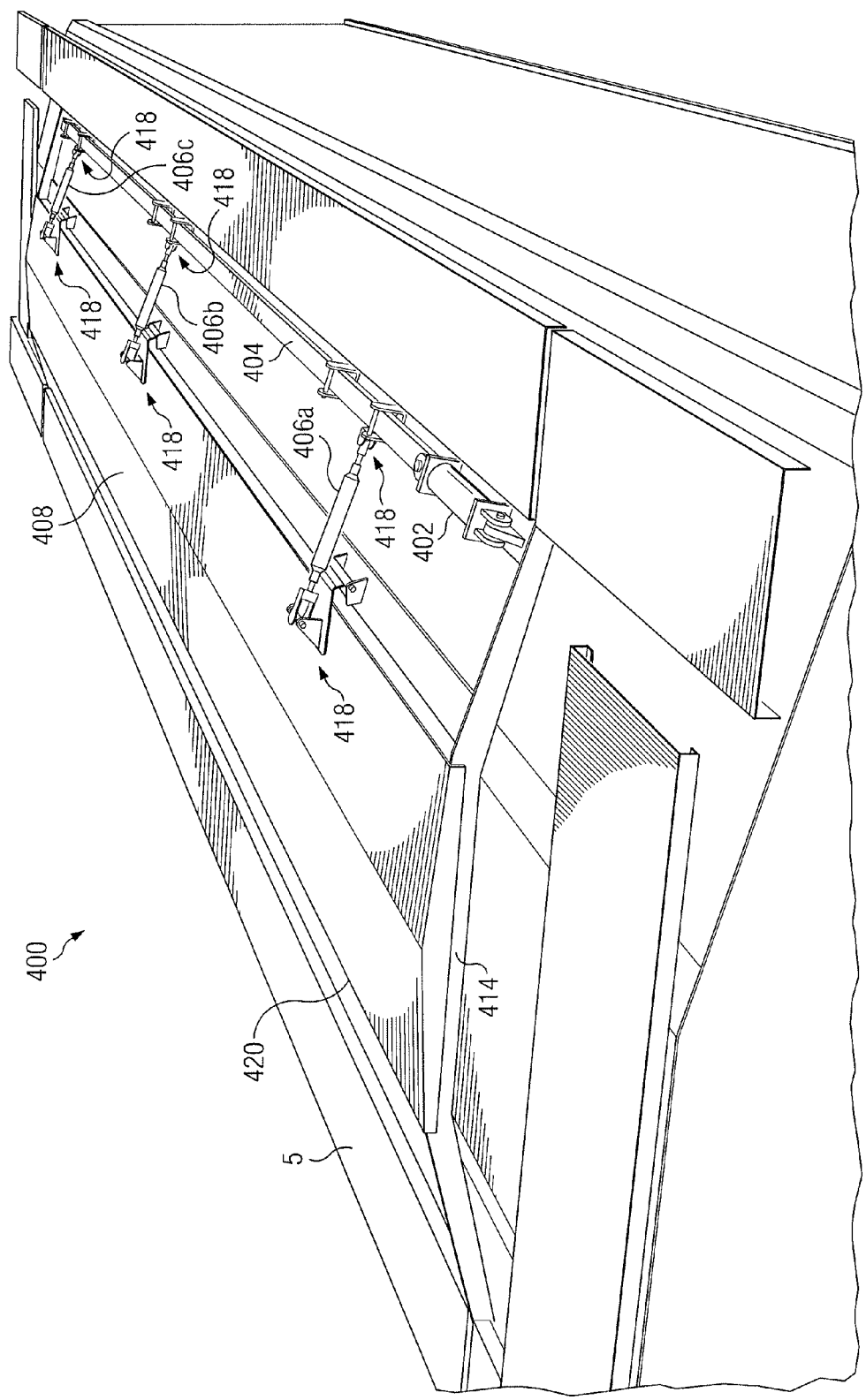
FIGS. 11A and 11B illustrate various perspective views of a particular embodiment of a powered remotely controlled hatch system including a single door assembly.
Figure 11B:
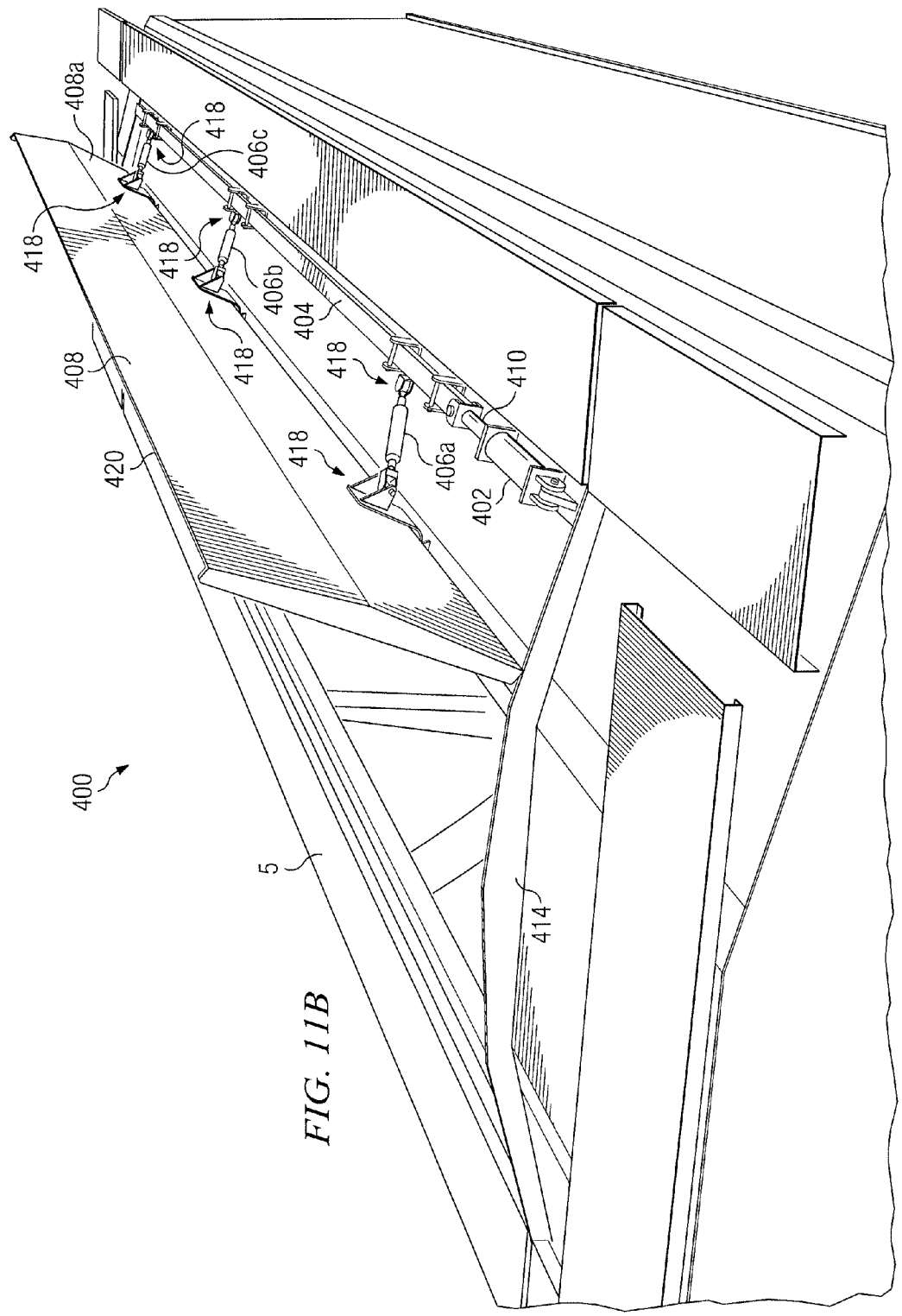

FIGS. 11A and 11B illustrate a particular embodiment of powered remotely controlled hatch system 400 that includes a single door assembly 408 (which may be referred to as a "single door assembly"). As shown in FIGS. 11A and 11B, system 400 includes actuator 402 and common linkage 404. Common linkage 404 is coupled to secondary linkages 406*a*, 406*b*, and 406*c* by joint 418. Secondary linkages 406*a*, 406*b*, and 406*c* are each coupled to door assembly 408 by a respective joint 418. Particular embodiments of system 400, however, may include any appropriate number and/or configuration of common linkages 404 and secondary linkages 406. In the embodiment of system 400 shown in FIGS. 11A and 11B, door assembly 404*a* includes edge portion 420. In particular embodiments, edge portion 420 may represent a rubberized or other weather-proof strip of material attached to door assembly 408. When door assembly 408 is in a closed position, edge portion 420 may abut against a top portion of railroad car 5, and/or may overlap an a top portion of railroad car 5. As a result, door assembly 408 may seal the interior of railroad car 5 in a closed position, thereby protecting the contents of railroad car 5 from weather, debris, and/or other undesirable elements.

FIG. 11B illustrates the single door assembly illustrated in FIG. 11A. As shown in FIG. 11B, system 400 includes door assembly 408 is in an open position with edge portions 420. As discussed above, actuator 402 extends rod 410, which moves or reciprocates common linkage 404 to open and/or close door assembly 408. In an open position, system 400 allows access to the interior of railroad car 5, thereby allowing the loading of unloading of lading through hatch 414.

Figure 12A:
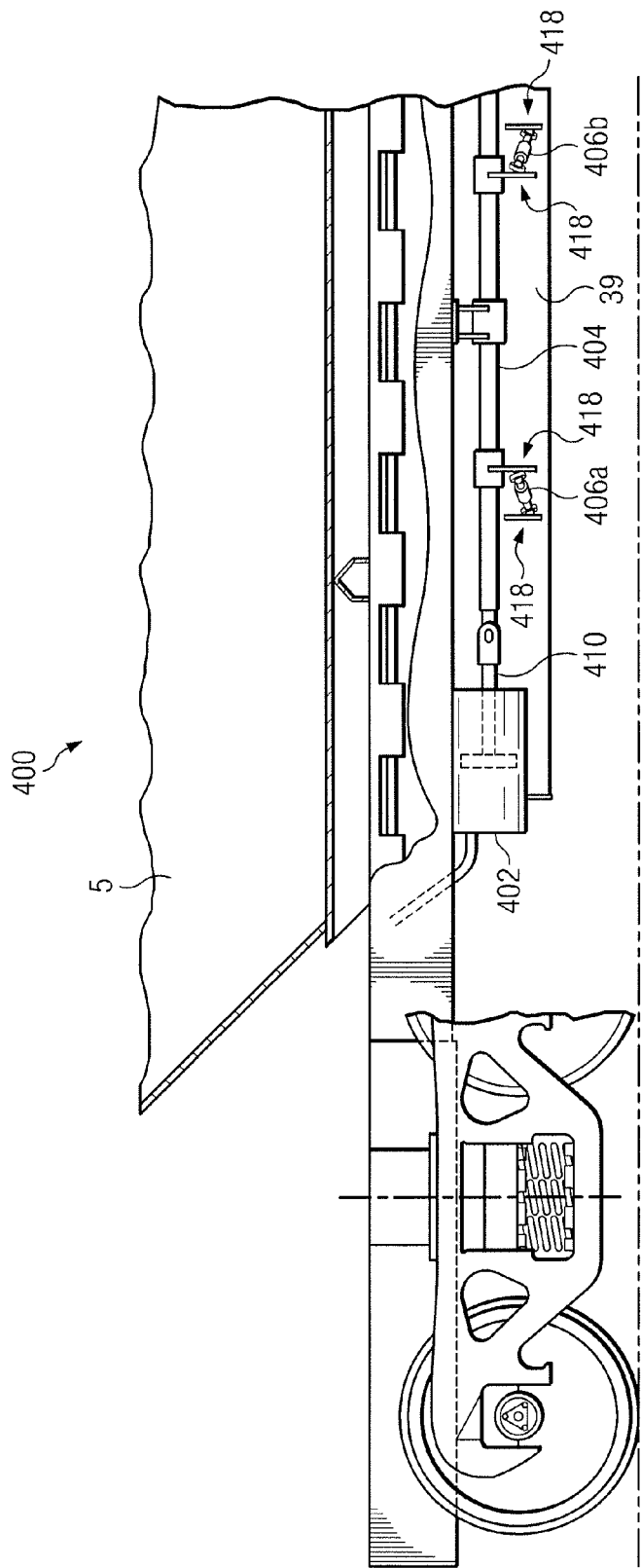
FIGS. 12A and 12B illustrate various perspective views of a particular embodiment of a powered remotely controlled hatch system including a discharge door.
Figure 12B:
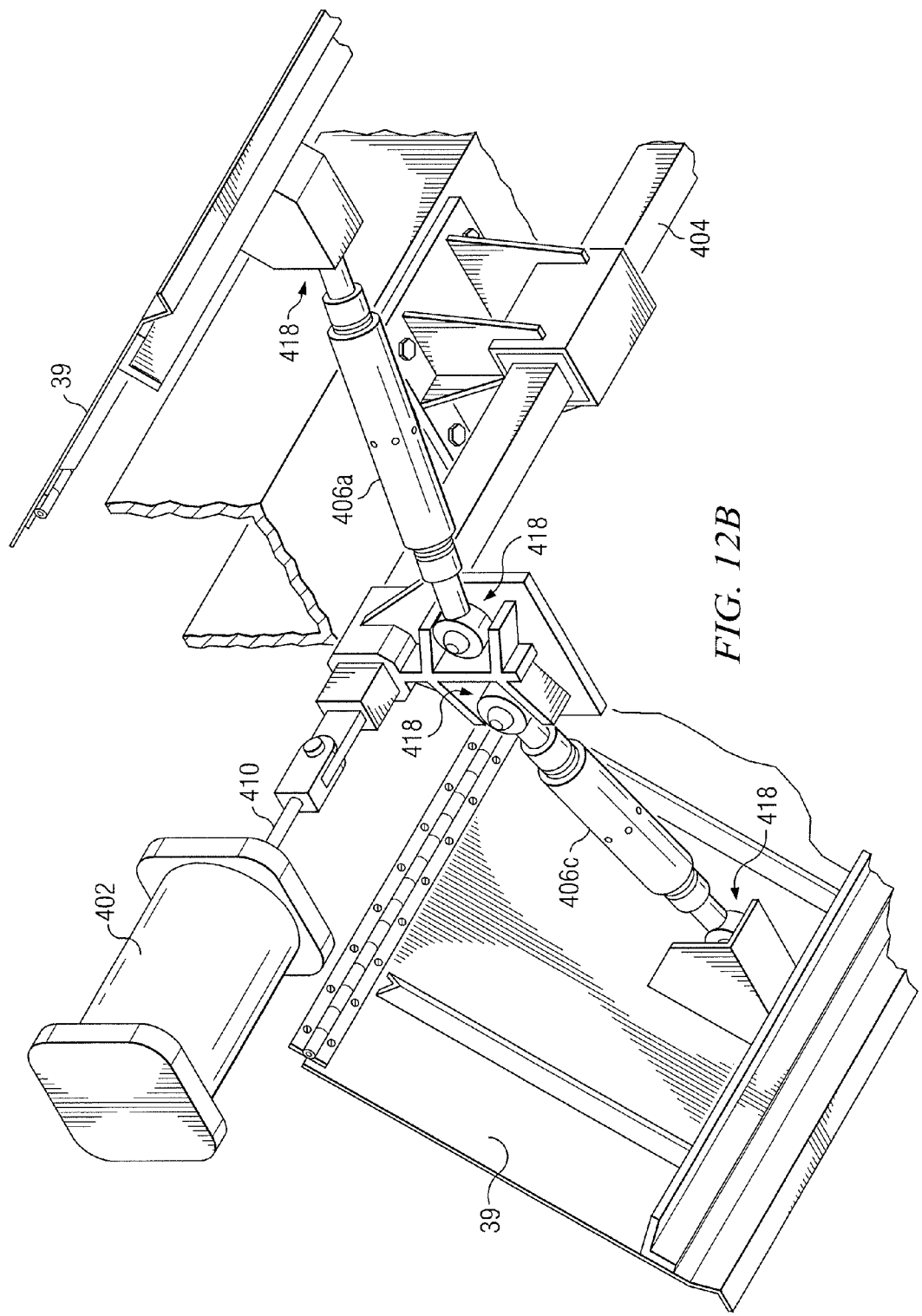

FIGS. 12A and 12B illustrate an embodiment of powered remotely controlled hatch system 400 positioned on a lower portion of railroad car 5. In the illustrated embodiment, system 400 includes actuator 402, common linkage 404, secondary linkages 406*a* and 406*b*, rod 410 and discharge door 39. Secondary linkages 406*a* and 406*b* are coupled to common linkage 404 and/or discharge door 39 by respective joints 418. As shown in FIGS. 12A and 12B, particular embodiments of system 400 operate to open and close discharge doors 39 located on a bottom portion of railroad car 5, thereby permitting the automated discharge or removal of lading from railroad car 5.

As discussed above with respect to FIG. 4, actuator 402 supplies force to common linkage 404 via rod 410. Actuator 402 may represent an hydraulic actuator, a pneumatic actuator, an electric actuator, a manual actuator (such as, for example, geared drives), and/or any other suitable drive actuator. Actuator 402 may be formed, located, placed, coupled, or disposed within or on any portion of railroad car 5. In the embodiment illustrated in FIGS. 12A and 12B, actuator 402 is located on a lower portion of railroad car 5 proximate to a center sill.

As discussed above, actuator 402 may represent a hydraulic cylinder. In such embodiments, actuator 402 may be connected to one or more hydraulic tubes, hoses, and/or pipes that supply fluid to actuator 402. Actuator 402 may derive its motive force from motor 412 (not expressly shown) that supplies fluid pressure through hydraulic tubing to actuator 402. Actuator 402 may be used to operate a cylinder by the use of an operating valve. For example, door valve 36 may be used to actuate actuator 402 in the open and closed directions. Door valve 36 may be a three-position operating door valve that allows fluid to flow through it to reach actuator 402, thereby allowing an operator to manually initiate the opening or closing of discharge doors 39.

To convey a reciprocating force from actuator 402 to open and close discharge door 39, particular embodiments of system 400 include common linkage 404 and secondary linkage 406. As shown in FIGS. 12A and 12B, common linkage 404 is oriented along a longitudinal axis of rail car 5 proximate to discharge doors 39*a* and 39*b*. In some embodiments, common linkage 404 may be attached to a bottom surface of railroad car 5 by one or more support guides. One or more support guides may be provided to guide the movement of common linkage 404 in a straight-line direction extending away from actuator 402. In some embodiments, common linkage 404 moves in a longitudinal direction relative to railroad car 5. It should be noted however, that common linkage 404 may be disposed in any suitable orientation relative to railroad car 5, such as, for example, in a transverse or oblique orientation.

Secondary linkages 406a and 406b are coupled to common linkage 404 and discharge doors 39a and 39b. Secondary linkages 406 may be rotatably coupled to common linkage 404, door assembly 408, and/or discharge door 39 by joint 418. In particular embodiments, joint 418 represents a universal joint, a ball joint, or any other suitable coupling mechanism. In particular embodiments, secondary linkages 406 may rotate in three dimensions, such as longitudinal, lateral, and vertical relative to common linkage 404 and/or discharge assembly 39 (generally referred to as having a three-degrees of motion mechanical linkage). Thus, as common linkage 404 moves or reciprocates in a straight-line direction, common linkage pushes or pulls on secondary linkages 406, which in turn push or pull on discharge doors 39. Although FIGS. 12A and 12B illustrate a particular embodiment of system 400 that includes a particular number of secondary linkages 406, system 400 may include any appropriate number of secondary linkages 406 suitable to open and close discharge doors 39.

Figure 13:
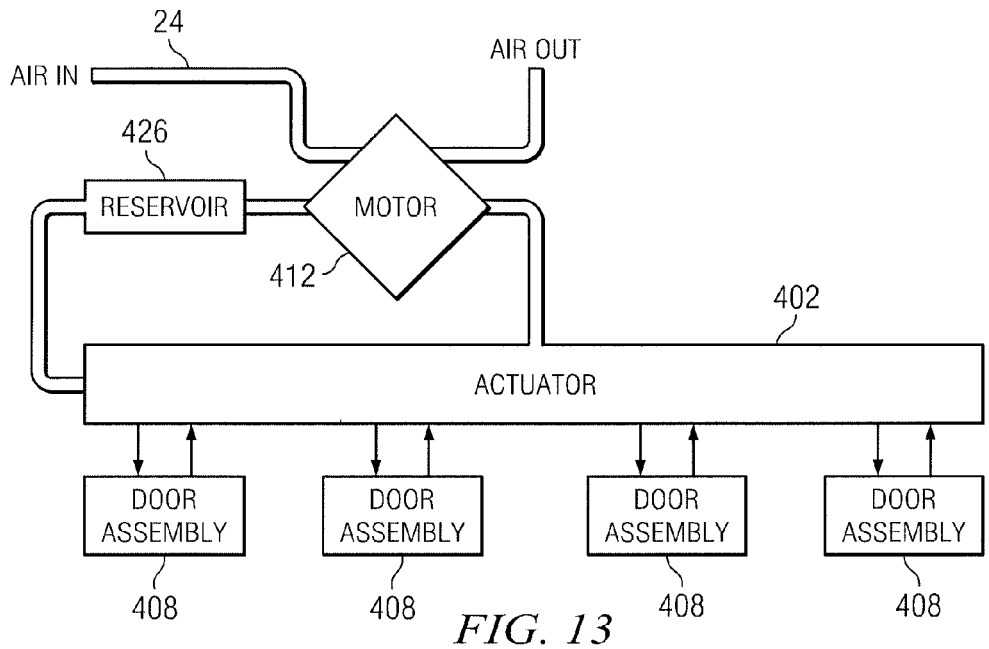
FIG. 13 illustrates a schematic diagram of a powered remotely controlled hatch system in accordance with particular embodiments of the present disclosure.

FIG. 13 is a schematic diagram illustrating powered remotely controlled hatch system 400 in accordance with particular embodiments of the present disclosure. In particular embodiments, motor 412 supplies pressurized hydraulic fluid to actuator 402. Hydraulic fluid used in system 400 may be stored in reservoir 426. Motor 412 may receive hydraulic fluid from reservoir 426, and hydraulic fluid exhausted from actuator 402 may be returned to reservoir 426 through one or more hydraulic tubes, pipes, or hoses. Motor 412 may represent a hydraulic pump powered by compressed air supplied by auxiliary reservoir 22, a train line extending from a reservoir that charges the respective brake system of a railroad car, a wayside air supply, and/or any other suitable source. Actuator 402 may represent a cylinder comprising two variable volume fluid chambers responsive to hydraulic pressure signals received from motor 414. Fluid pressure may be applied to one of the chambers and released from or vented from the other chamber to move or reciprocate a rod extending from an internal piston. In some embodiments, the rod may be directly connected to move door assembly 408, discharge door 39, and/or any other type of railcar door to an open and/or closed position. In some embodiments, the rod may be connected to a common linkage 404 that moves or reciprocates secondary linkages 406 connected to door assembly 408, discharge door 39, and/or any other type of railroad door, as discussed above. Although FIG. 13 illustrates a system 400 that includes a single actuator 402 and motor 412, particular embodiments may include any suitable number of actuators 402 and motors 412 configured to operate any suitable number of door assemblies 408, discharge doors 39, and/or any other suitable railcar doors.

Figure 14:
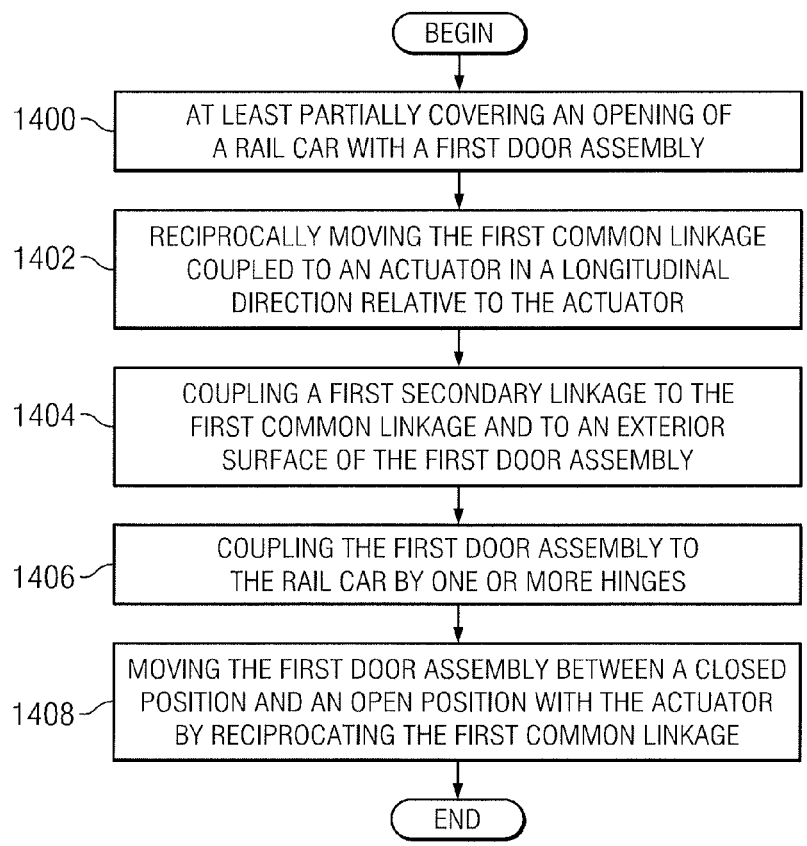
FIG. 14 illustrates a flow diagram of one method of powering rail car doors in accordance with particular embodiments of the present disclosure.

FIG. 14 is a flowchart illustrating one method for powering rail car doors in accordance with a particular embodiment of the present disclosure. Operation begins at step 1400 with a first door assembly 408 at least partially covering an opening of a rail car. As discussed above, door assembly 408 may represent a single door assembly 408, a double door assembly 408, or any other number and/or combinations of door assemblies 408. As a result, door assembly 408 may completely or partially cover an opening of a rail car (such as, for example, a hatch located on a top surface of a rail car) in a closed position. In particular embodiments, actuator 402 may be disposed proximate to the rail car opening. Actuator 402 may represent an hydraulic actuator, a pneumatic actuator, an electric actuator, a manual actuator (such as, for example, geared drives), and/or any other suitable drive actuator. Actuator 402 may include a cylinder, piston, and rod 410 extending from the piston. In particular embodiments, rod 410 may be coupled to common linkage 404.

At step 1402, a first common linkage 404 coupled to actuator 402 is reciprocally moved in a longitudinal direction relative to actuator 402. Actuator 402, in particular embodiments, is powered by pressurized hydraulic fluid supplied by motor 412. Motor 412 may receive power from pressurized or compressed air supplied by one or more sources. For example, in some embodiments, pressurized air may be supplied to motor 412 through a train line extending from a reservoir that charges the respective brake system of a railroad car. In some embodiments of system 400, compressed air may be supplied to motor 412 through a train line that is not part of the brake system of a railroad car extending from an air compressor located on a locomotive (not expressly shown). Additionally or alternatively, compressed air may be supplied to motor 412 by means of an wayside air supply. In such embodiments, a pipe or hose extending from wayside air supply station may be attached to an inlet port on motor 412 to provide compressed air to motor 412. In some embodiments, compressed air may be supplied to motor 412 by auxiliary reservoir 22 and communicated to motor 412 through air pipe 24, as described above with respect to FIGS. 1-3. Particular embodiments may supply compressed air to motor 412 through a combination of these methods.

At step 1404, a first secondary linkage 406 is coupled to the first common linkage 402 and to an exterior surface of door assembly 408. Thus, as common linkage 404 reciprocates in either an outwardly or inwardly direction in response to a motive force supplied by actuator 402, secondary linkage 406 pushes or pulls on first door assembly 408. Secondary linkage 406 may be coupled to first door assembly 408 and common linkage 402 by joint 418. In particular embodiments joint 418 represents a ball joint, a universal joint, and/or any other joint that permits angular motion relative to common linkage 404 and/or door assembly 408. In some embodiments, joint 418 may permit one or two degrees of motion relative to common linkage 402. As a result, as common linkage 402 moves in a straight-line longitudinal direction relative to rail car 5 and/or actuator 402, secondary linkage 406 is able to be positioned at an appropriate angle to exert a pushing or pulling force on door assembly 408.

At step 1406, the first door assembly 408 is coupled to rail car 5 by one or more hinges. Door assembly 408 may be coupled to a top surface of rail car 5, a bottom surface of rail car 5, and/or any other surface. Hinges may be configured to allow door assemblies 408 to swing along a horizontal, vertical, and/or any other appropriate axis.

At step 1408, the first door assembly 408 is moved between a closed position and an open position with the actuator 402 by reciprocating the first common linkage 404. In particular embodiments, actuator 402 represents a hydraulic cylinder that exerts a reciprocating force on rod 410 coupled to a piston. Rod 410 is coupled to common linkage 404. As rod 410 extends in an outwardly direction, the first common linkage 404 is moved in a straight-line direction relative to actuator 402 and/or rail car 5. This causes common linkage 404 to push and/or pull on secondary linkages 406, which in turn pull on door assembly 408. Door assemblies 408 rotate about hinges coupled to a top surface of railroad car 5 and/or hatch 414. As a result, door assembly 408 is moved from a closed position to an open position. Door assembly 408 may be moved from an open position to a closed position by reversing the process. For example, actuator 402 may retract rod 410, which pulls common linkage 404 in a straight-line direction toward actuator 402. This causes common linkage 404 to push and/or pull on secondary linkages 406, which in turn push on door assembly 408. As a result, door assembly 408 is moved from an open position to a closed position.

Some of the steps illustrated in FIG. 14 may be combined, modified, or deleted where appropriate, and additional steps may also be added to the flowchart. Additionally, steps may be performed in any suitable order without departing from the scope of the disclosure.

Figure 15:
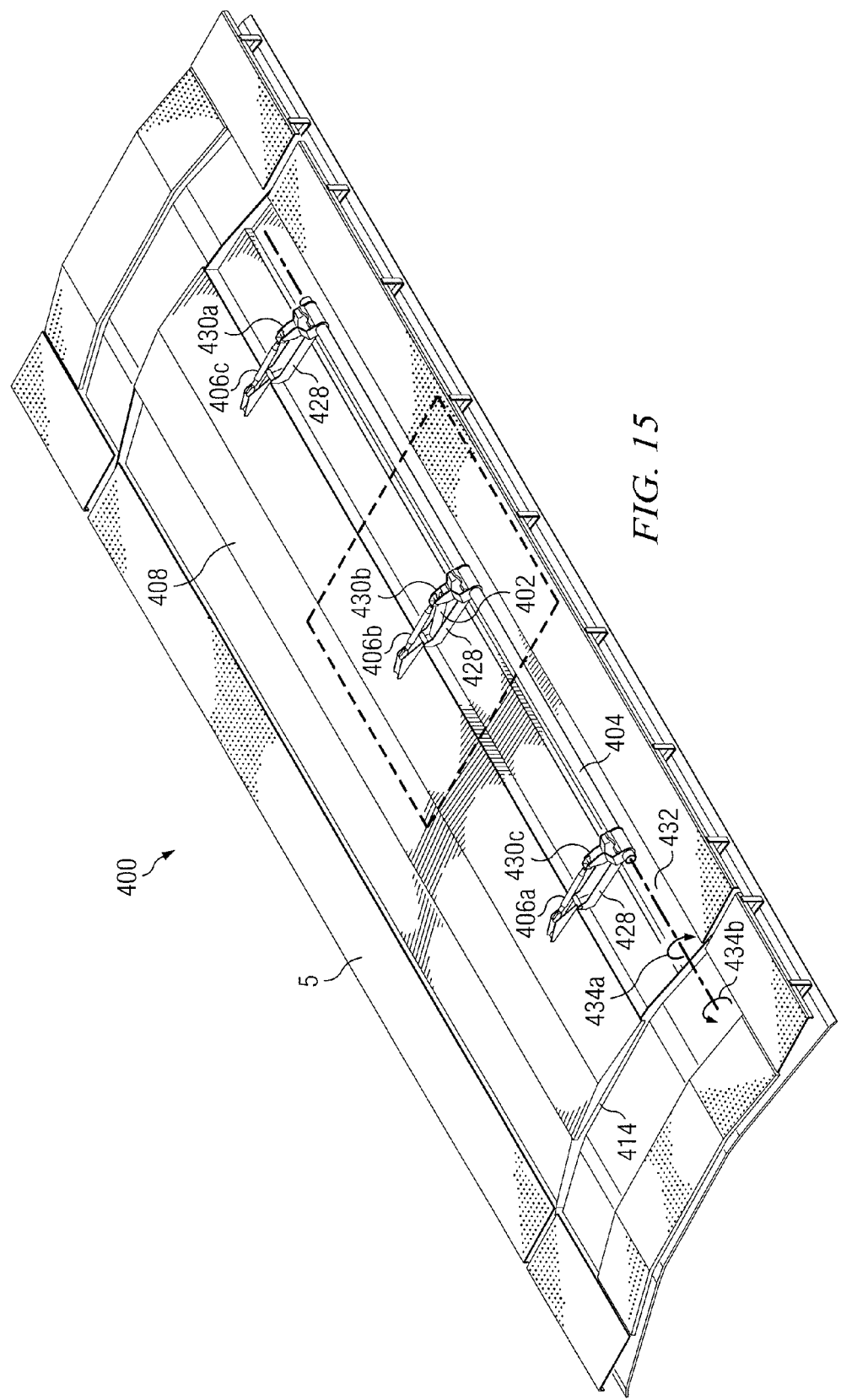
FIG. 15 illustrates a powered remotely controlled hatch system in accordance with particular embodiments of the present disclosure.

FIG. 15 illustrates powered remotely controlled hatch system 400 in accordance with particular embodiments of the present disclosure. As shown in FIG. 15, system 15 includes actuator 402, common linkage 404, and secondary linkage 406a, 406b, and 406c. Common linkage 404 is coupled to secondary linkages 406a, 406b, and 406c by bracket 430a, 430b, and 430c, respectively. Secondary linkages 406a, 406b, and 406c are each coupled to door assembly 408. Particular embodiments of system 400, however, may include any appropriate number and/or configuration of common linkages 404 and/or secondary linkages 406. Actuator 402 reciprocates rod 410 and supplies motive force to bracket 430, thereby rotating common linkage 404. In some embodiments, actuator 402 may be pivotally coupled to bracket 428 and rod 410 may be pivotally coupled to bracket 430. Bracket 430 is coupled to secondary linkages 406 by joint 418. In particular embodiments, joint 418 represents a universal joint, ball joint, or other suitable coupling mechanism that allows rotational motion relative to bracket 430 and/or door assembly 408. Thus, as common linkage 404 rotates, bracket 430 pushes or pulls on secondary linkages 406a, 406b, and 406c. As secondary linkages 406 move in response to force supplied by actuator 402, door assembly 408 opens and/or closes. In some embodiments, common linkage 404 rotates in a first direction to open door assembly 408, as illustrated by arrow 434a, and rotates in a second direction to close door assembly 408, as illustrated by arrow 434b.

In particular embodiments, common linkage 404 represents a torque tube that rotates about a central longitudinal axis of common linkage 404, represented by dotted line 432. Common linkage 404 may be positioned within a cooperatively shaped portion of bracket 428. As actuator 402 extends rod 410, rod 410 pushes on bracket 430. Bracket 430 may be rigidly connected to common linkage 430. As a result, as rod 410 is extended, common linkage 404 rotates in a direction of arrow 434a toward an outside edge of rail car 5. As common linkage 404 rotates within the cooperatively shaped hollow portion of bracket 428, bracket 430b transfers the force supplied by actuator 402 to pull on secondary linkage 406b. To close door assembly 408 over hatch 414, actuator 402 retracts rod 410, pulling bracket 430b towards actuator 402. As bracket 430b rotates inwardly, it rotates common linkage 404 in the direction indicated by arrow 434b. The rotation of common linkage 404 transfers the force supplied by actuator 402 to brackets 430a and 430c. Brackets 430a, 430b, and 430c push on secondary linkages 406a, 406b, and 406c, respectively. As a result, door assembly 408 is closed over hatch 414.

Figure 16:
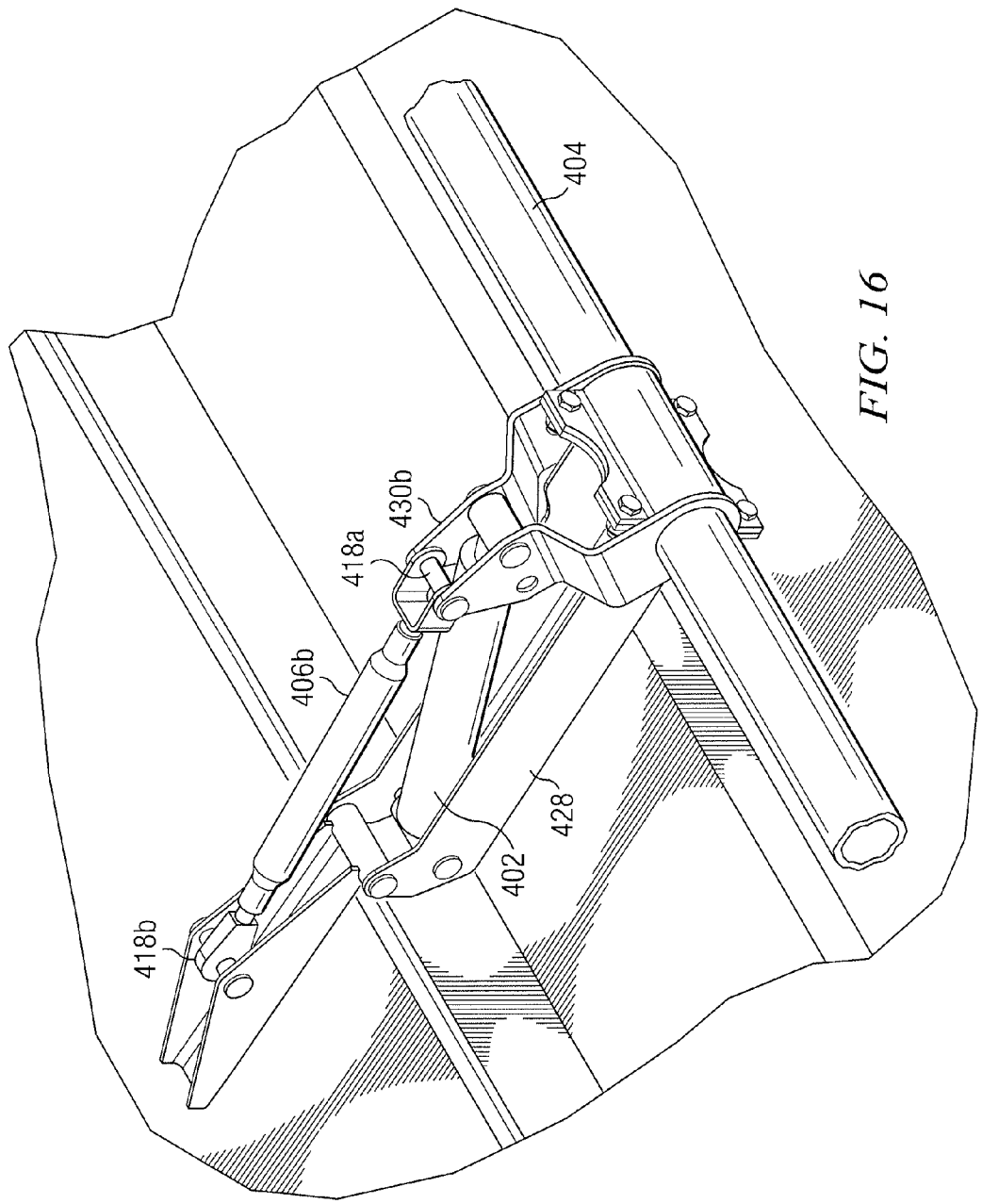
FIG. 16 illustrates an enlarged view of a portion dotted-line region of the powered remotely controlled hatch system of FIG. 15.

FIG. 16 illustrates an enlarged view of the dotted-line region of FIG. 15. As shown in FIG. 16, door assembly 408 is in a closed position over hatch 414. Common linkage 404 is positioned through a cooperatively shaped portion of bracket 428. Bracket 428 is suitably secured to a top surface of rail car 5. Actuator 402 extends rod 410 to push on bracket 430. In some embodiments, common linkage 404 may rotate within bracket 428. As a result, bracket 430 and common linkage 404 rotate in a direction indicated by arrow 434a. Bracket 430 is coupled to secondary linkage by joint 418a. Thus, as bracket 430 rotates, it pulls on secondary linkage 406. Secondary linkage 406 is coupled to door assembly 408 by joint 418b. As a result, as rod 410 is extended, bracket 430 rotates common linkage 404 in a direction indicated by arrow 434a, and pulls on secondary linkage 406.

Figure 17B:
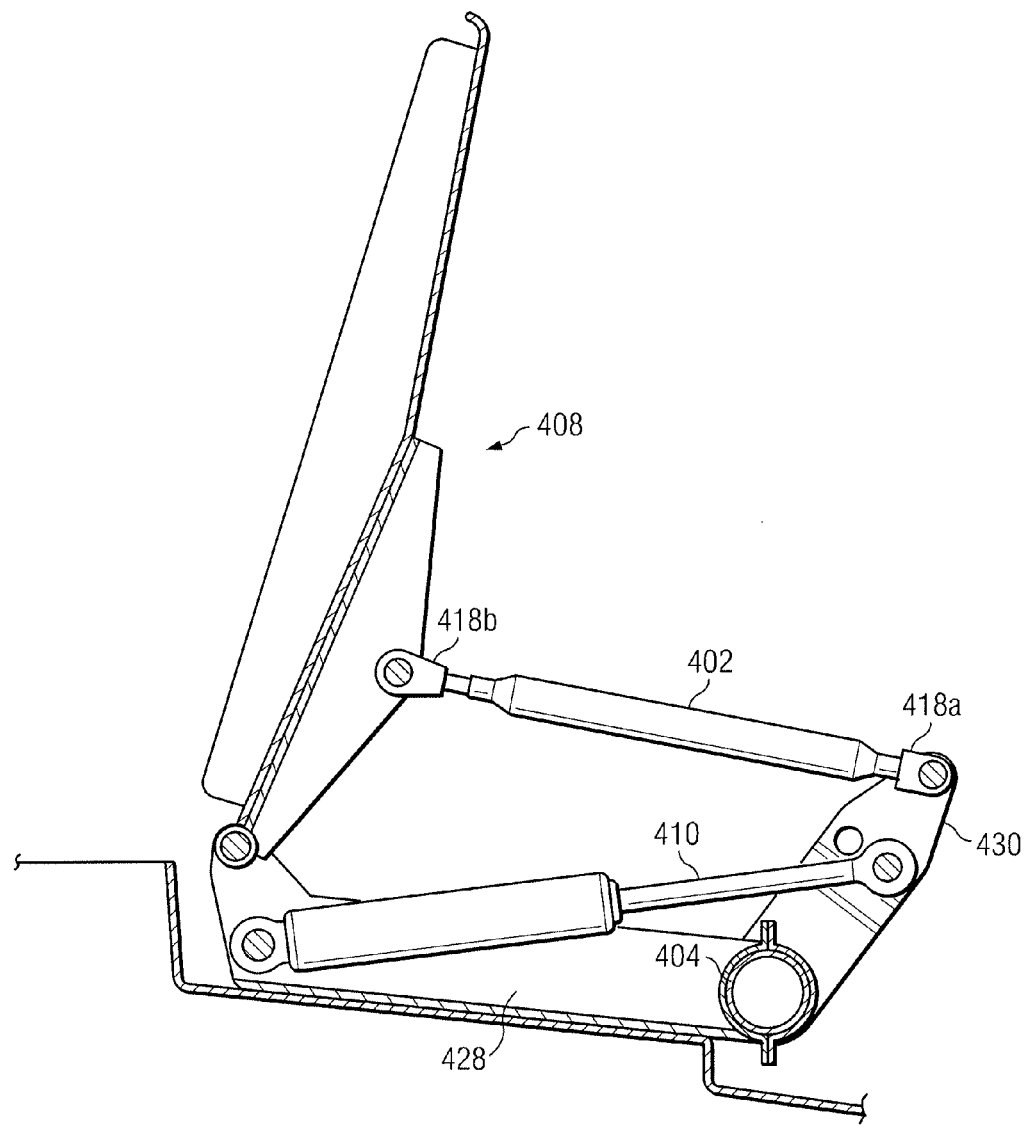

FIGS. 17A and 17B illustrate a cross-sectional views of powered remotely controlled hatch system 400 in accordance with particular embodiments of the present disclosure. FIG. 17A illustrates door assembly 408 in a closed position over hatch 414. FIG. 17B illustrates door assembly 408 in an open position over hatch 414. As shown in FIGS. 17A and 17B, particular embodiments of system 400 include actuator 402, common linkage 404, secondary linkage 406, rod 410, bracket 428, and bracket 430. Secondary linkage 406 may be coupled to door assembly 408 and bracket 430 by joints 418. As shown in FIG. 17B, as actuator 402 extends rod 410, bracket 430 rotates in conjunction with common linkage 404 about a longitudinal axis of common linkage 404. Bracket 430 pulls on secondary linkage 406, thereby pivoting door assembly 408 about hinges 436. In some embodiments, actuator 402 may be pivotally coupled to bracket 428 and rod 410 may be pivotally coupled to bracket 430.

FIG. 18A illustrates an isometric view of an interior portion of rail car 5. Particular embodiments of system 10 may include vent 42. Vent 42 may represent a shaft or other opening that channels air flow from the outside of rail car 5 to an interior hopper 44 of rail car 5. Vent 42 may be formed from steel or other appropriate material and may have a rectangular or any other suitable cross-sectional shape. As the contents of rail car 5 are discharged, vent 42 allows air to enter hopper 44. Air entering hopper 44 allows vacuum pressure formed in hopper 44 by the discharging of contents to be reduced or eliminated. Additionally, in particular embodiments, hydraulic hoses 438 extending from motor 412 to actuator 402 may be channeled through vent 42. In some embodiments, motor 412 may be positioned on a bottom surface of rail car 5 and actuator 402 may be positioned on a top surface of rail car 5. Thus, hydraulic hoses 438 may be channeled through vent 42 to communicate hydraulic or pneumatic fluid from motor 412 to actuator 402.

Figure 18B:
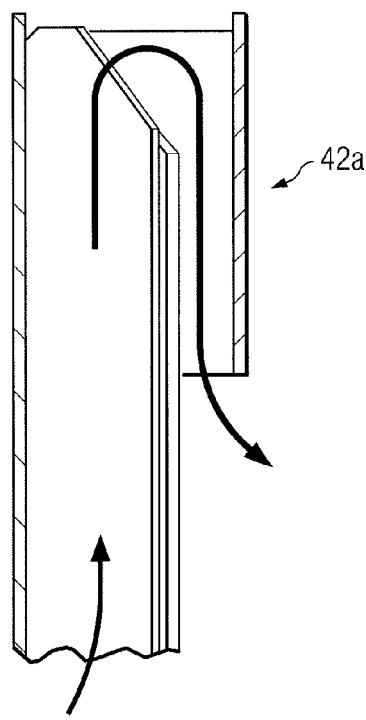
Figure 18D:
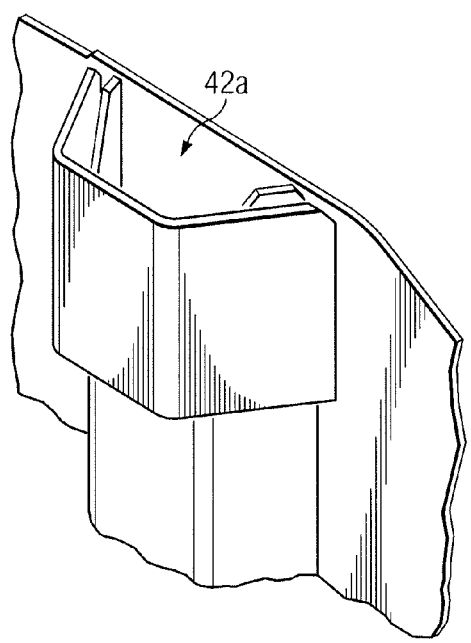
Figure 18C:
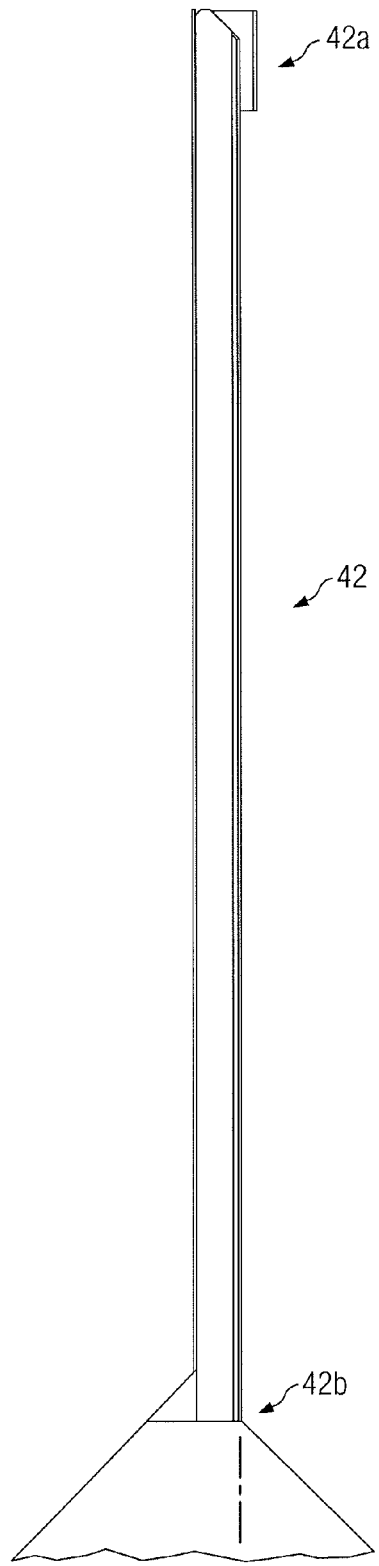

FIGS. 18B, 18C, and 18D illustrate various views of vent 42 described above with respect to FIG. 18A. FIG. 18B illustrates a top portion 42a of vent 42 showing a path of air flow into hopper 44. Vent 42 may include a curved channel through top portion 42a to reduce or eliminate the flow of contents of hopper 44 into vent 42 during transit or discharge. FIG. 18C illustrates a side cross-sectional view of vent 42. Vent 42 includes a lower portion 42b with an opening to the outside of rail car 5. Lower portion 42b allows air to enter vent 42 as contents of hopper 42 are discharged. FIG. 18D illustrates a close-up view of top portion 42a shown in FIGS. 18C and 18B. Air flow may travel up through vent 42 and down through an enclosure of top portion 42a.

Although the present disclosure has been described in detail with reference to particular embodiments, it should be understood that various other changes, substitutions, and alterations may be made hereto without departing from the spirit and scope of the present disclosure. For example, all of the elements included in particular embodiments of the present disclosure may be combined, rearranged, or positioned in order to accommodate particular manufacturing or operational needs.

What is claimed is:

1. A system, comprising:
    a first door assembly operable to at least partially cover a top hatch of a rail car;
    an actuator;
    a first common linkage coupled to the actuator and operable to rotate about a longitudinal axis;
    a first secondary linkage coupled to the first common linkage and coupled to an exterior surface of the first door assembly;
    a bracket, wherein the first secondary linkage is coupled to the first common linkage with the bracket; and
    wherein the actuator is coupled to the bracket and operable to cooperate with the first common linkage and the first secondary linkage to move the first door assembly between a closed position and an open position over the top hatch of the rail car by rotating the first common linkage about a longitudinal axis of the first common linkage.

2. The system of claim 1, wherein the first door assembly is coupled to the rail car by one or more hinges.

3. The system of claim 1, wherein the actuator comprises:
    a hydraulic cylinder; and
    a rod extending from a piston located inside the hydraulic cylinder, wherein the piston is operable to reciprocally move the rod; and wherein the rod is coupled to the bracket whereby reciprocal movement of the rod rotates the first common linkage.

4. The system of claim 1, wherein the first secondary linkage is operable to move the first door assembly in response to rotational movement of the first common linkage.

5. The system of claim 4, further comprising a second secondary linkage coupled to the first common linkage and operable to cooperate with the first secondary linkage to move the first door assembly in response to rotational movement of the first common linkage.

6. The system of claim 1, further comprising a motor operable to supply hydraulic pressure to the actuator, wherein the motor is powered by air pressure.

7. The system of claim 6, further comprising:
    an auxiliary reservoir coupled to a brake reservoir, wherein the auxiliary reservoir accumulates air by bleeding the air from the brake reservoir; and
    wherein air pressure is supplied to the motor by the auxiliary reservoir.

8. The system of claim 6, wherein air pressure is supplied to the motor by a wayside air supply.

9. The system of claim 6, wherein air pressure is supplied to the motor by a train line coupled to a brake reservoir.

10. The system of claim 1, wherein the bracket comprises a hollow portion in which the first common linkage is operable to rotate.

* * * * *